(12) United States Patent
Murakami et al.

(10) Patent No.: US 10,287,408 B2
(45) Date of Patent: May 14, 2019

(54) RESIN FILM, BARRIER FILM, ELECTRICALLY CONDUCTIVE FILM, AND MANUFACTURING METHOD THEREFOR

(71) Applicant: ZEON CORPORATION, Chiyoda-ku, Tokyo (JP)

(72) Inventors: Toshihide Murakami, Tokyo (JP); Satoshi Yamada, Tokyo (JP); Yasunori Ii, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 10 days.

(21) Appl. No.: 15/521,432

(22) PCT Filed: Oct. 9, 2015

(86) PCT No.: PCT/JP2015/078713
§ 371 (c)(1),
(2) Date: Apr. 24, 2017

(87) PCT Pub. No.: WO2016/067893
PCT Pub. Date: May 6, 2016

(65) Prior Publication Data
US 2017/0306113 A1    Oct. 26, 2017

(30) Foreign Application Priority Data
Oct. 28, 2014    (JP) .................. 2014-219381

(51) Int. Cl.
*C08J 5/18*       (2006.01)
*B32B 27/00*      (2006.01)
(Continued)

(52) U.S. Cl.
CPC .............. *C08J 5/18* (2013.01); *B32B 27/00* (2013.01); *C08G 61/08* (2013.01); *C08J 7/06* (2013.01);
(Continued)

(58) Field of Classification Search
CPC ...... C08J 5/18; C08G 61/08; C08G 2261/418; C08F 32/06; C08F 32/08
(Continued)

(56) References Cited

U.S. PATENT DOCUMENTS 5,194,534 A    3/1993 Bell
2009/0179358 A1    7/2009 Otoshi
(Continued)

FOREIGN PATENT DOCUMENTS

EP    1997848 A1    12/2008
JP    H05345817 A    12/1993
(Continued)

OTHER PUBLICATIONS

Dec. 28, 2015, International Search Report issued in the International Patent Application No. PCT/JP2015/078713.
(Continued)

*Primary Examiner* — Fred M Teskin
(74) *Attorney, Agent, or Firm* — Kenja IP Law PC

(57) ABSTRACT

Provided is a resin film having excellent size stability in a high-temperature environment. A resin film formed of a resin containing an alicyclic structure-containing polymer having crystallizability, wherein an absolute value of a thermal size change ratio when the film is heated at 150° C. for 1 hour is 1% or less in any in-plane direction of the film. The alicyclic structure-containing polymer may preferably be a hydrogenated product of a ring-opened polymer of dicyclopentadiene. Also provided is a method for producing the resin film including a step of relaxing strain of the crystallized film while the crystallized. film is kept flat.

9 Claims, 5 Drawing Sheets

(51) Int. Cl.
    *C08G 61/08*         (2006.01)
    *H01B 5/14*          (2006.01)
    *H01B 13/00*        (2006.01)
    *C08J 7/06*           (2006.01)
    *C08F 32/06*        (2006.01)

(52) U.S. Cl.
    CPC ............... *H01B 5/14* (2013.01); *H01B 13/00* (2013.01); *C08G 2261/418* (2013.01); *C08J 2365/00* (2013.01)

(58) Field of Classification Search
    USPC ...................................................... 526/348.1
    See application file for complete search history.

(56) References Cited

U.S. PATENT DOCUMENTS

2009/0297870 A1    12/2009    Takeyama et al.
2016/0137794 A1    5/2016     Yamada et al.

FOREIGN PATENT DOCUMENTS

| JP | 2002194067 A | 7/2002 |
|---|---|---|
| JP | 2009166325 A | 7/2009 |
| JP | 2013010309 A | 1/2013 |
| WO | 2007122932 A1 | 11/2007 |
| WO | 2015002019 A1 | 1/2015 |

OTHER PUBLICATIONS

May 2, 2017, International Preliminary Report on Patentability issued in the International Patent Application No. PCT/JP2015/078713.

May 30, 2018, Extended European Search Report issued by the European Patent Office in the corresponding European Patent Application No. 15856094.6.

T. A. Davidson et al., "Polymerization of Dicyclopentadiene: A Tale of Two Mechanisms", Macromolecules, 1996, pp. 786-788, vol. 29, No. 2.

W. Kaminsky et al., "New Polymers by Homogenous Zirconocene/Aluminoxane Catalysts", Makromolekulare Chemie, Macromolecular Symposia, 1991, pp. 83-93, vol. 47.

RESIN FILM, BARRIER FILM, ELECTRICALLY CONDUCTIVE FILM, AND MANUFACTURING METHOD THEREFOR

FIELD

The present invention relates to a resin film; a barrier film and an electroconductive film which are each provided with the resin film; and methods for producing the resin film, the barrier film, and the electroconductive film.

BACKGROUND

A technology of crystallizing an alicyclic structure-containing polymer in a film formed from a resin containing an alicyclic structure-containing polymer having crystallizability by heating the film has been known (Patent Literatures 1 and 2). The film formed of the resin containing such an alicyclic structure-containing polymer having crystallizability usually has excellent heat resistance.

CITATION LIST

Patent Literature

Patent Literature 1: Japanese Patent Application Laid-Open No. 2002-194067 A
Patent Literature 2: Japanese Patent Application Laid-Open No. 2013-010309 A

SUMMARY

Technical Problem

In general, a film formed from a resin containing an alicyclic structure-containing polymer having no crystallizability tends to have high coefficient of friction between the films. Therefore, when such a film is wound into a roll shape, for example, the film is subjected to anti-blocking coating or bonded to a masking film, to prevent blocking of the films. The blocking of the films herein refers to a phenomenon where the film in contact with a certain surface adheres to the contacted surface to be in a state of not being easily separable.

On the other hand, the inventors of the present invention have studied and found that the coefficient of friction between films formed from a resin containing an alicyclic structure-containing polymer having crystallizability can be usually decreased. Therefore, the inventors have tried to develop a film which can suppress occurrence of blocking using the resin containing an alicyclic structure-containing polymer having crystallizability without a treatment of anti-blocking coating, a masking film, or the like.

In addition to blocking, a gauge band and a scratch may occur in a film. The gauge band of the film herein refers to a band-shaped concavo or convex portion which extends in a circumferential direction that is formed on a surface of a film roll in which the film is wound into a roll shape. The scratch of the film refers to a scratched damage caused by rubbing of wound and stacked parts of the film which is wound into a roll shape. In order to suppress occurrence of the gauge band and the scratch, the inventors have tried a knurling treatment of the film.

The knurling treatment refers to a treatment of forming a protrusion on a film. The protrusion formed by the knurling treatment is formed so as to be protruded from a film surface around the protrusion. Thereby the apparent thickness of the film at a region where the protrusion is formed becomes large. For example, when a region near an end part of the film in the width direction thereof is subjected to the knurling treatment, it is expected that occurrence of a gauge band and a scratch is suppressed. Such a knurling treatment may be performed using, for example, a laser beam. Specifically, the film is irradiated with a laser beam to form a protrusion at a position which is irradiated with the laser beam.

However, it was found that, when the film formed of the resin containing an alicyclic structure-containing polymer having crystallizability is subjected to the knurling treatment using a laser beam, deformation such as waviness is likely to occur in the film. According to the studies by the inventors, it is deduced that such deformation of the film occurs because the resin containing an alicyclic structure-containing polymer having crystallizability is likely to be largely changed in size (usually, thermally shrunk) in a high-temperature environment. That is, it is deduced that, when the temperature of the film which has absorbed the laser beam is increased, the film at a position where the temperature is increased is largely changed in size, and the film is thus deformed due to the size change. Specifically, a prior-art film containing an alicyclic structure-containing polymer is largely changed in size at a ratio of about 1.5% to 4% at a temperature within a temperature range that exceeds the glass transition temperature (for example, 140° C. to 150° C.) thereof, and deformation sometimes occurs. When the film thus deformed is wound into a roll shape, winding may be made uneven, or a crack may be generated in the film.

The present invention has been made in view of the aforementioned problems. An object of the present invention is to provide a resin film having excellent size stability in a high-temperature environment; a barrier film and an electroconductive film which are each provided with the resin film; and methods for producing the resin film, the barrier film, and the electroconductive film.

Solution to Problem (1) A resin film formed of a resin containing an alicyclic structure-containing polymer having crystallizability, wherein
an absolute value of a thermal size change ratio when the film is heated at 150° C. for 1 hour is 1% or less in any in-plane direction of the film.

(2) The resin film according to (1), wherein the alicyclic structure-containing polymer is a hydrogenated product of a ring-opened polymer of dicyclopentadiene.

(3) The resin film according to (1) or (2), wherein the resin film is an optical film.

(4) A barrier film comprising:
the resin film according to any one of (1) to (3); and
a barrier layer provided on the resin film.

(5) An electroconductive film comprising:
the resin film according to any one of (1) to (3); and an electroconductive layer provided on the resin film.

(6) A method for producing the resin film according to any one of (1) to (3), comprising:
a step of setting a temperature of a first film formed of a resin containing an alicyclic structure-containing polymer having crystallizability to a temperature which is equal to or higher than a glass transition temperature of the alicyclic structure-containing polymer and equal to or lower than a melting point of the alicyclic structure-containing polymer in a strained state where at least two sides of the first film are held, to obtain a crystallized film; and a step of relaxing strain of the crystallized film while the crystallized film is kept flat at a temperature which is equal to or higher than the glass transition temperature of the alicyclic structure-containing polymer and equal to or lower than the melting point of the alicyclic structure-containing polymer.

(7) The method according to (6), comprising a step of stretching the first film before the step of obtaining the crystallized film.

(8) A method for producing a barrier film, comprising a step of forming a barrier layer on the resin film according to any one of (1) to (3).

(9) A method for producing an electroconductive film, comprising a step of forming an electroconductive layer on the resin film according to any one of (1) to (3).

Advantageous Effects of Invention

The present invention can provide a resin film having excellent size stability in a high-temperature environment; a barrier film and an electroconductive film which are each provided with the resin film; and methods for producing the resin film, the barrier film, and the electroconductive film.

DESCRIPTION OF EMBODIMENTS

Figure 1:
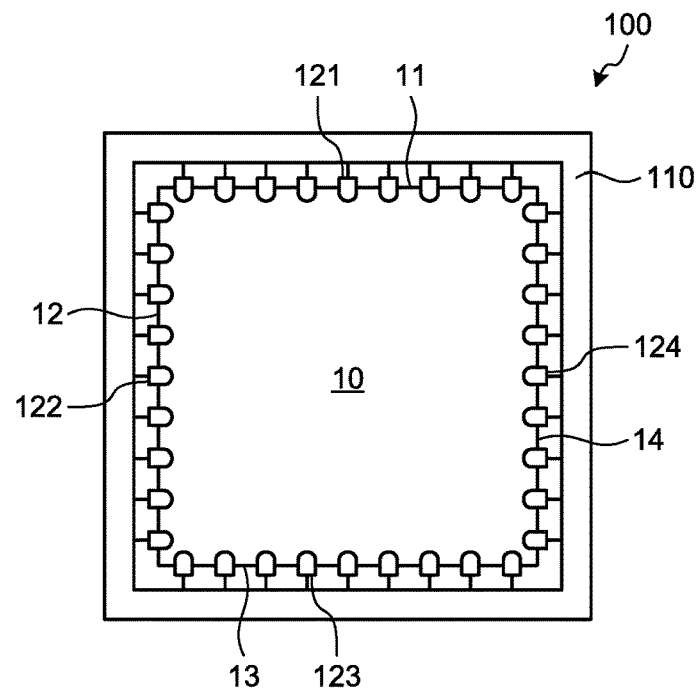
FIG. 1 is a plan view schematically illustrating an example of a holding device.

Hereinafter, the present invention will be described in detail with reference to embodiments and examples. However, the present invention is not limited to the following embodiments and the examples described below, and may be freely modified and practiced without departing from the scope of claims of the present invention and the scope of their equivalents.

In the following description, a "long-length" film refers to a film having a length of five times or more times the width of the film, and preferably ten times or more times the width, and specifically a film having a length long enough to be wound in a roll shape for storage or transportation.

In the following description, the directions of an element being "parallel", "perpendicular", and "orthogonal" may allow errors within the bound of not impairing the effects of the present invention, for example within a range of ±5°, unless otherwise specified.

In the following description, a longitudinal direction of a long-length film is usually parallel to a conveyance direction of the film in a production line.

[1. Resin Film]

The resin film of the present invention is a film formed of a resin containing an alicyclic structure-containing polymer having crystallizability. In the following description, the aforementioned resin may be referred to as "crystallizable resin". The resin film of the present invention has excellent size stability in a high-temperature environment. Specifically, when the resin film of the present invention is heated at 150° C. for 1 hour the absolute value of thermal size change ratio of the resin film is equal to or less than a specific value in any in-plane direction of the film.

[1.1. Crystallizable Resin]

The crystallizable resin contains an alicyclic structure-containing polymer having crystallizability. The alicyclic structure-containing polymer herein refers to a polymer having an alicyclic structure in its molecule, and specifically a polymer which is obtainable by a polymerization reaction of a cyclic olefin used as a monomer, or a hydrogenated product thereof. As the alicyclic structure-containing polymer, one type thereof may be solely used, and two or more types thereof may also be used in combination at any ratio.

Examples of the alicyclic structure of the alicyclic structure-containing polymer may include a cycloalkane structure and a cycloalkene structure. Of these, a cycloalkane structure is preferable since a resin film having excellent characteristics such as thermal stability is easily obtained. The number of carbon atoms contained in one alicyclic structure is preferably 4 or more, and more preferably 5 or more, and is preferably 30 or less, more preferably 20 or less, and particularly preferably 15 or less. When the number of carbon atoms contained in one alicyclic structure is within the aforementioned range, mechanical strength, heat resistance, and moldability are exhibited in a highly balanced manner.

The ratio of a structural unit having the alicyclic structure relative to all structural units in the alicyclic structure-containing polymer is preferably 30% by weight or more, more preferably 50% by weight or more, and particularly preferably 70% by weight or more. When the ratio of the structural unit having the alicyclic structure in the alicyclic structure-containing polymer is made larger as described above, heat resistance can be enhanced.

The remaining part in the alicyclic structure-containing polymer, except for the structural unit having the alicyclic structure, is not especially limited, and may be appropriately selected depending on the purposes of use.

The alicyclic structure-containing polymer contained in the crystallizable resin has a crystallizability. The term "alicyclic structure-containing polymer having crystallizability" as used herein refers to an alicyclic structure-containing polymer that has a melting point Tm (i.e., the melting point can be observed with a differential scanning calorimeter (DSC)). The melting point Tm of the alicyclic structure-containing polymer is preferably 200° C. or higher, and more preferably 230° C. or higher, and is preferably 290° C. or lower. When the alicyclic structure-containing polymer having such a melting point Tm is used, a resin film having a particularly excellent balance between the moldability and the heat resistance can be obtained.

The weight-average molecular weight (Mw) of the alicyclic structure-containing polymer is preferably 1,000 or more, and more preferably 2,000 or more, and is preferably 1,000,000 or less, and more preferably 500,000 or less. The alicyclic structure-containing polymer having such a weight average molecular weight has an excellent balance between the molding workability and the heat resistance.

The molecular weight distribution (Mw/Mn) of the alicyclic structure-containing polymer is preferably 1.0 or more, and more preferably 1.5 or more, and is preferably 4.0 or less, and more preferably 3.5 or less. Mn represents a number-average molecular weight. The alicyclic structure-containing polymer having such a molecular weight distribution has excellent molding workability.

The weight-average molecular weight (Mw) and the molecular weight distribution (Mw/Mn) of the alicyclic structure-containing polymer may be measured as a value in terms of polystyrene by gel permeation chromatography (GPC) using tetrahydrofuran as a developing solvent.

The glass transition temperature Tg of the alicyclic structure-containing polymer is not particularly limited, and is usually 85° C. or higher and is usually 170° C. or lower.

Examples of the alicyclic structure-containing polymer may include the following polymers ($\alpha$) to ($\delta$). Of these, it is preferable that the crystalline alicyclic structure-containing polymer is the polymer ($\beta$) since a resin film having excellent heat resistance is easily obtained.

Polymer ($\alpha$): a ring-opened polymer of a cyclic olefin monomer, having crystallizability Polymer ($\beta$): a hydrogenated product of the polymer ($\alpha$), having crystallizability Polymer ($\gamma$): an addition polymer of a cyclic olefin monomer, having crystallizability Polymer ($\delta$): a hydrogenated product or the like of the polymer ($\gamma$), having crystallizability Specifically, the alicyclic structure-containing polymer is more preferably a ring-opened polymer of dicyclopentadiene having crystallizability and a hydrogenated product of the ring-opened polymer of dicyclopentadiene having crystallizability, and particularly preferably the hydrogenated product of the ring-opened polymer of dicyclopentadiene having crystallizability. The ring-opened polymer of dicyclopentadiene described herein refers to a polymer in which the ratio of a structural unit derived from dicyclopentadiene relative to all structural units is usually 50% by weight or more, preferably 70% by weight or more, more preferably 90% by weight or more, and further preferably 100% by weight.

The method for producing the polymer ($\alpha$) and the polymer ($\beta$) will be described below.

The cyclic olefin monomer usable in the production of the polymer ($\alpha$) and the polymer ($\beta$) is a compound having a ring structure formed by carbon atoms and has a carbon-carbon double bond in the ring. Examples of the cyclic olefin monomer may include a norbornene-based monomer. When the polymer ($\alpha$) is a copolymer, a cyclic olefin having a monocyclic structure may be used as the cyclic olefin monomer.

The norbornene-based monomer is a monomer containing a norbornene ring. Examples of the norbornene-based monomer may include a bicyclic monomer, such as bicyclo[2.2.1]hept-2-ene (common name: norbornene), and 5-ethylidene-bicyclo[2.2.1]hept-2-ene (common name: ethylidene norbornene), and a derivative thereof (for example, the one having a substituent in a ring); a tricyclic monomer, such as tricyclo[4.3.0.1$^{2,5}$]deca-3,7-diene (common name: dicyclopentadiene) and a derivative thereof; and a tetracyclic monomer, such as 7,8-benzotricyclo[4.3.0.1$^{2,5}$]dec-3-ene (common name: methanotetrahydrofluorene: also referred to as 1,4-methano-1,4,4a,9a-tetrahydrofluorene) and a derivative thereof, tetracyclo[4.4.0.1$^{2,5}$.1$^{7,10}$]dodec-3-ene (common name: tetracyclododecene), and 8-ethylidene tetracyclo[4.4.0.1$^{2,5}$.1$^{7,10}$]-3-dodecene and a derivative thereof.

Examples of the substituent in the monomer may include an alkyl group, such as a methyl group and an ethyl group; an alkenyl group, such as a vinyl group; an alkylidene group, such as propan-2-ylidene; an aryl group, such as a phenyl group; a hydroxy group; an acid anhydride group; a carboxyl group; and an alkoxycarbonyl group, such as a methoxycarbonyl group. The monomer may have solely one type of the substituent, and may also have two or more types thereof in combination at any ratio.

Examples of the cyclic olefin having a monocyclic structure may include a cyclic monoolefin, such as cyclobutene, cyclopentene, methylcyclopentene, cyclohexene, methylcyclohexene, cycloheptene, and cyclooctene; and a cyclic diolefin, such as cyclohexadiene, methylcyclohexadiene, cyclooctadiene, methylcyclooctadiene and phenylcyclooctadiene.

As the cyclic olefin monomer, one type thereof may be solely used, and two or more types thereof may also be used in combination at any ratio. When two or more types of the cyclic olefin monomer are used, the polymer ($\alpha$) may be a block copolymer or a random copolymer.

The cyclic olefin monomer may have a structure with which endo and exo stereoisomers may exist. As the cyclic olefin monomer, any of the endo and exo isomers may be used. Either one of the endo and exo isomers may be solely used, and an isomer mixture containing the endo and exo isomers at any ratio may also be used. In particular, it is preferable that the ratio of one stereoisomer is at high level relative to the other since the crystallizability of the alicyclic structure-containing polymer is enhanced and a resin film having particularly excellent heat resistance is easily obtained. For example the ratio of the endo or exo isomer is preferably 80% or more, more preferably 90% or more, and further preferably 95% or more. It is preferable that the ratio of the endo isomer is high since synthesis is easy.

The crystallizability of the polymer ($\alpha$) and the polymer ($\beta$) can be usually enhanced by increasing the degree of syndiotacticity (ratio of racemo diads) of these polymers. From the viewpoint of increasing the degree of stereoregularity of the polymer ($\alpha$) and the polymer ($\beta$), the ratio of racemo diads in the structural units of the polymer ($\alpha$) and the polymer ($\beta$) is preferably 51% or more, more preferably 60% or more, and particularly preferably 70% or more.

The ratio of racemo diads may be measured by a $^{13}$C-NMR spectrum analysis. Specifically, the measurement may be performed by the following method.

A polymer sample is subjected to $^{13}$C-NMR measurement at 200° C. by an inverse-gated decoupling method using orthodichlorobenzene-d$^4$ as a solvent. From the result of the $^{13}$C-NMR measurement, the ratio of racemo diads of the polymer sample may be obtained on the basis of an intensity ratio of the signal at 43.35 ppm derived from meso diads and the signal at 43.43 ppm derived from racemo diads using the peak of orthodichlorobenzene-d$^4$ at 127.5 ppm as a reference shift.

In synthesis of the polymer ($\alpha$), a ring-opening polymerization catalyst is usually used. As the ring-opening polymerization catalyst, one type thereof may be solely used, and two or more types thereof may also be used in combination at any ratio. It is preferable that such a ring-opening polymerization catalyst for synthesis of the polymer ($\alpha$) is a ring-opening polymerization catalyst which can achieve ring-opening polymerization of the cyclic olefin monomer to produce a ring-opened polymer having syndiotacticity. Preferable examples of the ring-opening polymerization catalyst may include a ring-opening polymerization catalyst including a metal compound represented by the following formula (1):

$$M(NR^1)X_{4-a}(OR^2)_a \cdot L_b \qquad (1)$$

(wherein

M is a metal atom selected from the group consisting of transition metal atoms of Group 6 of the periodic table, $R^1$ is a phenyl group optionally having a substituent on at least one of the positions 3, 4, and 5, or a group represented by —$CH_2R^3$ ($R^3$ is a group selected from the group consisting of a hydrogen atom, an alkyl group optionally having a substituent, and an aryl group optionally having a substituent), $R^2$ is a group selected from the group consisting of an alkyl group optionally having a substituent and an aryl group optionally having a substituent, X is a group selected from the group consisting of a halogen atom, an alkyl group optionally having a substituent, an aryl group optionally having a substituent, and an alkylsilyl group, L is a neutral electron donor ligand, a is a number of 0 or 1, and b is an integer of 0 to 2.)

In the formula (1), M is a metal atom selected from the group consisting of transition metal atoms of Group 6 of the periodic table. M is preferably chromium, molybdenum, or tungsten, more preferably molybdenum or tungsten, and particularly preferably tungsten.

In the formula (1), $R^1$ is a phenyl group optionally having a substituent on at least one of the positions 3, 4, and 5, or a group represented by —$CH_2R^3$.

The number of carbon atoms of the phenyl group optionally having a substituent on at least one of the positions 3, 4, and 5 of $R^1$ is preferably 6 to 20, and more preferably 6 to 15. Examples of the substituent may include an alkyl group, such as a methyl group and an ethyl group; a halogen atom, such as a fluorine atom, a chlorine atom, and a bromine atom; and an alkoxy group, such as a methoxy group, an ethoxy group, and an isopropoxy group. The group may have solely one type of the substituent, and may also have two or more types thereof in combination at any ratio. In $R^1$, the substituents present on at least two of the positions 3, 4, and 5 may be bonded to each other, to form a ring structure.

Examples of the phenyl group optionally having a substituent on at least one of the positions 3, 4, and 5 may include an unsubstituted phenyl group; a monosubstituted phenyl group, such as a 4-methylphenyl group, a 4-chlorophenyl group, a 3-methoxyphenyl group, a 4-cyclohexylphenyl group, and a 4-methoxyphenyl group; a disubstituted phenyl group, such as a 3,5-dimethylphenyl group, a 3,5-dichlorophenyl group, a 3,4-dimethylphenyl group, and a 3,5-dimethoxyphenyl group; a trisubstituted phenyl group, such as a 3,4,5-trimethylphenyl group, and a 3,4,5-trichlorophenyl group; and a 2-naphthyl group optionally having a substituent, such as a 2-naphthyl group a 3-methyl-2-naphthyl group, and a 4-methyl-2-naphthyl group.

In the group represented by —$CH_2R^3$ of $R^1$, $R^3$ is a group selected from the group consisting of a hydrogen atom an alkyl group optionally having a substituent, and an aryl group optionally having a substituent.

The number of carbon atoms in the alkyl group optionally having a substituent of $R^3$ is preferably 1 to 20 and more preferably 1 to 10. The alkyl group may be either linear or branched. Examples of the substituent may include a phenyl group optionally having a substituent, such as a phenyl group and a 4-methylphenyl group; and an alkoxyl group, such as a methoxy group and an ethoxy group. As the substituent, one type thereof may be solely used, and two or more types thereof may also be used in combination at any ratio.

Examples of the alkyl group optionally having a substituent of $R^3$ may include a methyl group, an ethyl group, a propyl group, an isopropyl group, a butyl group, an isobutyl group, a tert-butyl group, a pentyl group, a neopentyl group, a benzyl group, and a neophyl group.

The number of carbon atoms in the aryl group optionally having a substituent of $R^3$ is preferably 6 to 20, and more preferably 6 to 15. Examples of the substituent may include an alkyl group, such as a methyl group and an ethyl group; a halogen atom, such as a fluorine atom, a chlorine atom, and a bromine atom; and an alkoxy group, such as a methoxy group, an ethoxy group, and an isopropoxy group. As the substituent, one type thereof may be solely used, and two or more types thereof may also be used in combination at any ratio.

Examples of the aryl group optionally having a substituent of $R^3$ may include a phenyl group, a 1-naphthyl group, a 2-naphthyl group, a 4-methylphenyl group, and a 2,6-dimethylphenyl group.

Of these, the group represented by $R^3$ is preferably an alkyl group having 1 to 20 carbon atoms.

In the formula (1), $R^2$ is a group selected from the group consisting of an alkyl group optionally having a substituent and an aryl group optionally having a substituent. As each of the alkyl group optionally having a substituent and the aryl group optionally having a substituent of $R^2$, a group selected from groups exemplified as the alkyl group optionally having a substituent and the aryl group optionally having a substituent of $R^3$ may be optionally used.

In the formula (1), X is a group selected from the group consisting of a halogen atom, an alkyl group optionally having a substituent, an aryl group optionally having a substituent, and an alkylsilyl group.

Examples of the halogen atom of X may include a chlorine atom, a bromine atom, and an iodine atom.

As each of the alkyl group optionally having a substituent and the aryl group optionally having a substituent of X, a group selected from groups exemplified as the alkyl group optionally having a substituent and the aryl group optionally having a substituent of $R^3$ may be optionally used.

Examples of the alkylsilyl group of X may include a trimethylsilyl group, a triethylsilyl group, and a tert-butyldimethylsilyl group.

When the metal compound represented by the formula (1) has two or more X's in one molecule, these X's may be the same or different from each other. Further, the two or more X's may be bonded to each other to form a ring structure.

In the formula (1), L is a neutral electron donor ligand.

Examples of the neutral electron donor ligand of L may include an electron donor compound containing an atom of Group 14 or 15 of the periodic table. Specific examples thereof may include phosphines, such as trimethylphosphine, triisopropylphosphine, tricyclohexylphosphine, and triphenylphosphine; ethers, such as diethyl ether, dibutyl ether, 1,2-dimethoxyethane, and tetrahydrofuran; and amines, such as trimethylamine, triethylamine, pyridine, and lutidine. Of these, ethers are preferable. When the metal compound represented by the formula (1) has two or more L's in one molecule, these L's may be the same or different from each other.

The metal compound represented by the formula (1) is preferably a tungsten compound having a phenylimide group. That is, it is preferable that the compound of the formula (1) is a compound wherein M is a tungsten atom and $R^1$ is a phenyl group. In particular, a tetrachloro tungsten phenylimide(tetrahydrofuran) complex is more preferable.

The method for producing the metal compound represented by the formula (1) is not particularly limited. As described in Japanese Patent Application Laid-open No. Hei. 5-345817 A, for example, the metal compound represented by the formula (1) may be produced by mixing an oxyhalogenated product of a Group 6 transition metal; a phenyl isocyanate optionally having a substituent on at least one of the positions 3, 4, and 5 or a monosubstituted methyl isocyanate; a neutral electron donor ligand (L); and if necessary, an alcohol, a metal alkoxide, and a metal aryloxide.

In the aforementioned production method, the metal compound represented by the formula (1) is usually obtained in a state where the compound is contained in a reaction liquid. After production of the metal compound, the aforementioned reaction liquid as it is may be used as a catalyst liquid for a ring-opening polymerization reaction. Alternatively, the metal compound may be isolated and purified from the reaction liquid by a purification treatment, such as crystallization, and the obtained metal compound may then be supplied to the ring-opening polymerization reaction.

As the ring-opening polymerization catalyst, the metal compound represented by the formula (1) may be solely used, and the metal compound represented by the formula (1) may also be used in combination with other components. For example, the metal compound may be used in combination with an organometallic reducing agent, to improve the polymerization activity.

Examples of the organometallic reducing agent may include organometallic compounds of Groups 1, 2, 12, 13, and 14 in the periodic table, having a hydrocarbon group of 1 to 20 carbon atoms. Examples of such organometallic compounds may include an organolithium, such as methyllithium, n-butyilithium, and phenyllithium; an organomagnesium, such as butylethylmagnesium, butyloctylmagnesium, dihexylmagnesium, ethylmagnesium chloride, n-butylmagnesium chloride, and allylmagnesium bromide; an organozinc, such as dimethylzinc, diethylzinc, and diphenylzinc; an organoaluminum, such as trimethylammonium, triethylammonium, triisobutylammonium, diethylammonium chloride, ethylaluminum sesquichloride, ethylaluminum dichloride, diethylaluminum ethoxide, diisobutylaluminum isobutoxide, ethylaluminum diethoxide, and isobutylaluminum diisobutioxide; and an organotin, such as tetramethyltin, tetra(n-butyl)tin, and tetraphenyltin. Of these, an organoaluminum and an organotin are preferable As the organometallic reducing agent, one type thereof may be solely used, and two or more types thereof may also be used in combination at any ratio.

The ring-opening polymerization reaction is usually performed in an organic solvent. As the organic solvent, an organic solvent which can dissolve or disperse the ring-opened polymer and a hydrogenated product thereof under specific conditions and does not inhibit the ring-opening polymerization reaction and a hydrogenation reaction may be used. Examples of such an organic solvent may include aliphatic hydrocarbons, such as pentane, hexane and heptane; alicyclic hydrocarbons, such as cyclopentane, cyclohexane, methylcyclohexane, dimethylcyclohexane, trimethylcyclohexane, ethylcyclohexane, diethylcyclohexane, decahydronaphthalene, bicycloheptane, tricyclodecane, hexahydroindene, and cyclooctane; aromatic hydrocarbons, such as benzene, toluene, and xylene; halogen-containing aliphatic hydrocarbons, such as dichloromethane, chloroform and 1,2-dichloroethane; halogen-containing aromatic hydrocarbons, such as chlorobenzene and dichlorobenzene; nitrogen-containing hydrocarbons, such as nitromethane, nitrobenzene, and acetonitrile; ethers, such as diethyl ether and tetrahydrofuran; and mixed solvents that are combinations of the foregoing. Of these, as the organic solvent, aromatic hydrocarbons, aliphatic hydrocarbons, alicyclic hydrocarbons, and ethers are preferable. As the organic solvent, one type thereof may be solely used, and two or more types thereof may also be used in combination at any ratio.

The ring-opening polymerization reaction may be initiated by, for example, mixing the cyclic olefin monomer the metal compound represented by the formula (1), and if necessary, the organometallic reducing agent. The order of mixing these components is not particularly limited. For example, a solution containing the metal compound represented by the formula (1) and the organometallic reducing agent may be mixed in a solution containing the cyclic olefin monomer. Alternatively, a solution containing the cyclic olefin monomer and the metal compound represented by the formula (1) may be mixed in a solution containing the organometallic reducing agent. Further, a solution containing the metal compound represented by the formula (1) may be mixed with a solution containing the cyclic olefin monomer and the organometallic reducing agent When mixing these components, the total amount of each component may be mixed at a time or over a plurality of times. The components may also be continuously mixed over a relatively long period of time (for example, 1 minute or more).

The concentration of the cyclic olefin monomer in the reaction liquid at the starting point of the ring-opening polymerization reaction is preferably 1% by weight or more, more preferably 2% by weight or more, and particularly preferably 3% by weight or more, and is preferably 50% by weight or less, more preferably 45% by weight or less, and particularly preferably 40% by weight or less. When the concentration of the cyclic olefin monomer is equal to or more than the lower limit value of the aforementioned range, productivity can be improved. When it is equal to or less than the upper limit value thereof, the viscosity of the reaction liquid after the ring-opening polymerization reaction can be lowered. Consequently, a subsequent hydrogenation reaction can be easily performed.

It is desirable that the amount of the metal compound represented by the formula (1) used in the ring-opening polymerization reaction is set such that the molar ratio of "metal compound:cyclic olefin monomer" falls within a specific range. Specifically, the molar ratio is preferably 1:100 to 1:2,000,000, more preferably 1:500 to 1,000,000, and particularly preferably 1:1,000 to 1:500,000 When the amount of the metal compound is equal to or more than the lower limit value of the aforementioned range, sufficient polymerization activity can be obtained. When it is equal to or less than the upper limit value thereof, the metal compound can be easily removed after the reaction The amount of the organometallic reducing agent is preferably 0.1 mol or more, more preferably 0.2 mol or more, and particularly preferably 0.5 mol or more, and is preferably 100 mol or less, more preferably 50 mol or less, and particularly preferably 20 mol or less, relative to 1 mol of the metal compound represented by the formula (1). When the amount of the organometallic reducing agent is equal to or more than the lower limit value of the aforementioned range, polymerization activity can be sufficiently increased. When it is equal to or less than the upper limit value thereof, occurrence of a side reaction can be suppressed.

The polymerization reaction system of the polymer (α) may contain an activity modifier. When the activity modifier is used, the ring-opening polymerization catalyst can be stabilized, the reaction rate of the ring-opening polymerization reaction can be adjusted, and the molecular weight distribution of the polymer can be adjusted.

As the activity modifier, an organic compound having a functional group may be used. Examples of the activity modifier may include an oxygen-containing compound, a nitrogen-containing compound, and a phosphorus-containing organic compound.

Examples of the oxygen-containing compound may include ethers, such as diethyl ether, diisopropyl ether, dibutyl ether, anisole, furan, and tetrahydrofuran; ketones, such as acetone, benzophenone, and cyclohexanone; and esters, such as ethyl acetate.

Examples of the nitrogen-containing compound may include nitriles, such as acetonitrile and benzonitrile; amines, such as triethylamine, triisopropylamine, quinuclidine, and N,N-diethylaniline; and pyridines, such as pyridine, 2,4-lutidine, 2,6-lutidine, and 2-tert-butylpyridine.

Examples of the phosphorus-containing compound may include phosphines, such as triphenylphosphine, tricyclohexylphosphine, triphenyl phosphate, and trimethyl phosphate; and phosphine oxides, such as triphenylphosphine oxide.

As the activity modifier, one type thereof may be solely used, and two or more types thereof may also be used in combination at any ratio.

The amount of the activity modifier in the polymerization reaction system of the polymer (α) is preferably 0.01 mol % to 100 mol % relative to 100 mol % of the metal compound represented by the formula (1).

The polymerization reaction system of the polymer (α) may contain a molecular weight modifier to adjust the molecular weight of the polymer (α). Examples of the molecular weight modifier may include α-olefins, such as 1-butene, 1-pentene, 1-hexene, and 1-octene; an aromatic vinyl compound, such as styrene and vinyltoluene; an oxygen-containing vinyl compound, such as ethyl vinyl ether isobutyl vinyl ether, allyl glycidyl ether, allyl acetate, allyl alcohol, and glycidyl methacrylate; a halogen-containing vinyl compound, such as allyl chloride; a nitrogen-containing vinyl compound, such as acrylamide; a non-conjugated diene, such as 1,4-pentadiene, 1,4-hexadiene 1.5-hexadiene, 1,6-heptadiene, 2-methyl-1,4-pentadiene, and 2.5-dimethyi-1,5-hexadiene; and a conjugated diene, such as 1,3-butadiene, 2-methyl-1,3-butadiene, 2,3-dimethyl-1,3-butadiene, 1,3-pentadiene, and 1,3-hexadiene.

As the molecular weight modifier, one type thereof may be solely used, and two or more types thereof may also be used in combination at any ratio.

The amount of the molecular weight modifier in the polymerization reaction system for polymerizing the polymer (α) may be appropriately determined in accordance with a target molecular weight. Specifically, the amount of the molecular weight modifier preferably falls within a range of 0.1 mol % to 50 mol % relative to the cyclic olefin monomer.

The polymerization temperature is preferably −78° C. or higher, and more preferably −30° C. or higher, and is preferably +200° C. or lower, and more preferably +180° C. or lower.

The polymerization time may depend on the reaction scale. Specifically, the polymerization time preferably falls within a range of 1 minute to 1,000 hours.

The polymer (α) may be obtained by the aforementioned production method. When the polymer (α) is hydrogenated, the polymer (β) may be produced.

For example, the polymer (α) may be hydrogenated by supplying hydrogen to the reaction system containing the polymer (α) in the presence of a hydrogenation catalyst in accordance with an ordinary method. The hydrogenation reaction usually does not affect the tacticity of the hydrogenated product as long as reaction conditions of the hydrogenation reaction are set appropriately.

As the hydrogenation catalyst, a homogeneous catalyst or heterogeneous catalyst which is known as a hydrogenation catalyst for an olefin compound may be used.

Examples of the homogeneous catalyst may include a catalyst including a combination of a transition metal compound and an alkali metal compound, such as cobalt acetate/triethyialuminum, nickel acetylacetonate/triisobutylaluminum, titanocene dichloride/n-butyllithium, zirconocene dichloride/sec-butyllithium, and tetrabutoxytitanate/dimethylmagnesium; and a noble metal complex catalyst, such as dichlorobis(triphenylphosphine) palladium, chlorohydride-carbonyltris(triphenylphosphine) ruthenium, chlorohydride-carbonylbis(tricyciohexylphosphine) ruthenium, bis(tricyclohexylphosphine)benzylidine ruthenium (IV) dichloride, and chlorotris(triphenylphosphine) rhodium.

Examples of the heterogeneous catalyst may include a metal catalyst, such as nickel, palladium, platinum, rhodium, and ruthenium; and a solid catalyst in which the aforementioned metal is supported on a carrier, such as carbon, silica, diatomaceous earth, alumina, and titanium oxide, examples of which may include nickel/silica, nickel/diatomaceous earth, nickel/alumina, palladium/carbon, palladium/silica, palladium/diatomaceous earth, and palladium/alumina.

As the hydrogenation catalyst, one type thereof may be solely used, and two or more types thereof may also be used in combination at any ratio.

The hydrogenation reaction is usually performed in an inert organic solvent. Examples of the inert organic solvent may include aromatic hydrocarbons, such as benzene and toluene; aliphatic hydrocarbons, such as pentane and hexane; alicyclic hydrocarbons, such as cyclohexane and decahydronaphthalene; and ethers, such as tetrahydrofuran and ethylene glycol dimethyl ether. As the inert organic solvent, one type thereof may be solely used, and two or more types thereof may also be used in combination at any ratio. The inert organic solvent may be the same as, and may also be different from the organic solvent used in the ring-opening polymerization reaction. Further, the hydrogenation catalyst may be mixed with the reaction liquid of the ring-opening polymerization reaction to perform the hydrogenation reaction.

The reaction conditions for the hydrogenation reaction usually vary depending on the hydrogenation catalyst to be used.

The reaction temperature of the hydrogenation reaction is preferably −20° C. or higher, more preferably −10° C. or higher, and particularly preferably 0° C. or higher, and is preferably +250° C. or lower, more preferably +220° C. or lower, and particularly preferably +200° C. or lower. When the reaction temperature is equal to or more than the lower limit value of the aforementioned range, the reaction rate can be increased. When it is equal to or less than the upper limit value thereof, occurrence of a side reaction can be suppressed.

The hydrogen pressure is preferably 0.01 MPa or more, more preferably 0.05 MPa or more, and particularly preferably 0.1 MPa or more, and is preferably 20 MPa or less, more preferably 15 MPa or less, and particularly preferably 10 MPa or less. When the hydrogen pressure is equal to or more than the lower limit value of the aforementioned range, the reaction rate can be increased. When it is equal to or less than the upper limit, value thereof, a special device such as a high pressure resistant reaction device is not necessary. Therefore, facility costs can be reduced.

The reaction time of the hydrogenation reaction may be set to any time length in which a desired hydrogenation ratio is achieved, and is preferably 0.1 hours to 10 hours.

After the hydrogenation reaction, the polymer (β) which is the hydrogenated product of the polymer (α) is usually collected in accordance with an ordinary method.

The hydrogenation ratio (the ratio of main-chain double bonds that are hydrogenated) in the hydrogenation reaction is preferably 98% or more, and more preferably 99% or more. When the polymer has a high hydrogenation ratio, heat resistance of the alicyclic structure-containing polymer can be improved.

Herein, the hydrogenation ratio of the polymer may be measured by $^1$H-NMR measurement at 145° C. using orthodichlorobenzene-d$^4$ as a solvent.

Subsequently, the method for producing the polymer (γ) and the polymer (δ) will be described.

As a cyclic olefin monomer used in the production of the polymer (γ) and the polymer (δ), any cyclic olefin monomer selected from those exemplified as the cyclic olefin monomers usable in the production of the polymer (α) and the polymer (β) may be used. As the cyclic olefin monomer, one type thereof may be solely used, and two or more types thereof may also be used in combination at any ratio.

In the production of the polymer (γ), an optional monomer copolymerizable with the cyclic olefin monomer may be used as a monomer in combination with the cyclic olefin monomer. Examples of the optional monomer may include an α-olefin having 2 to 20 carbon atoms, such as ethylene, propylene, 1-butene, 1-pentene, and 1-hexene; an aromatic vinyl compound, such as styrene and α-methylstyrene; and a non-conjugated diene, such as 1,4-hexadiene, 4-methyl-1,4-hexadiene, 5-methyl-1,4-hexadiene, and 1,7-octadiene. Of these, an α-olefin is preferable, and ethylene is more preferable. As the optional monomer, one type thereof may be solely used, and two or more types thereof may also be used in combination at any ratio.

The weight ratio of the cyclic olefin monomer relative to the optional monomer (cyclic olefin monomer:optional monomer) is preferably 30:70 to 99:1, more preferably 50:50 to 97:3, and particularly preferably 70:30 to 95:5.

In cases wherein two or more types of the cyclic olefin monomer are used, and in cases wherein the cyclic olefin monomer and the optional monomer are used in combination, the polymer (γ) may be a block copolymer, and may also be a random copolymer.

In the synthesis of the polymer (γ), an addition polymerization catalyst is usually used. Examples of the addition polymerization catalyst may include a vanadium-based catalyst formed from a vanadium compound and an organoaluminum compound, a titanium-based catalyst formed from a titanium compound and an organoaluminum compound, and a zirconium-based catalyst formed from a zirconium complex and an aluminoxane. As the addition polymer catalyst, one type thereof may be solely used, and two or more types thereof may also be used in combination at any ratio.

The amount of the addition polymerization catalyst is preferably 0.000001 mol or more, and more preferably 0.00001 mol or more, and is preferably 0.1 mol or less, and more preferably 0.01 mol or less, relative to 1 mol of the monomer.

The addition polymerization of the cyclic olefin monomer is usually performed in an organic solvent. As the organic solvent, any organic solvent, selected from those exemplified as the organic solvents usable in the ring-opening polymerization of the cyclic olefin monomer may be used. As the organic solvent, one type thereof may be solely used, and two or more types thereof may also be used in combination at any ratio.

The polymerization temperature in the polymerization for producing the polymer (γ) is preferably −50° C. or higher, more preferably −30° C. or higher, and particularly preferably −20° C. or higher, and is preferably 250° C. or lower, more preferably 200° C. or lower, and particularly preferably 150° C. or lower. The polymerization time is preferably 30 minutes or more, and more preferably 1 hour or more, and is preferably 20 hours or less, and more preferably 10 hours or less.

The polymer (γ) may be obtained by the aforementioned production method. The polymer (δ) may be produced by hydrogenating the polymer (γ).

Hydrogenation of the polymer (γ) may be performed by the same method as described for the hydrogenation of the polymer (α).

The ratio of the alicyclic structure-containing polymer having crystallizability in the crystallizable resin is preferably 50% by weight or more, more preferably 70% by weight or more, and particularly preferably 90% by weight or more. When the ratio of the alicyclic structure-containing polymer having crystallizability is equal to or more than the lower limit value of the aforementioned range, the heat resistance of the resin film of the present invention can be enhanced.

The alicyclic structure-containing polymer contained in the crystallizable resin does not have to be crystallized before the production of the resin film of the present invention. However, after the production of the resin film of the present invention, the alicyclic structure-containing polymer contained in the crystallizable resin constituting the resin film may usually have high crystallinity degree as a result of crystallization. Specific range of crystallinity degree may be appropriately selected in accordance with a desired performance, and is preferably 10% or more, and more preferably 15% or more. When the crystallinity degree of the alicyclic structure-containing polymer contained in the resin film is equal to or more than the lower limit value of the aforementioned range, high heat resistance and chemical resistance can be imparted to the resin film.

The crystallinity degree of the alicyclic structure-containing polymer contained in the resin film may be measured by an X-ray diffraction method.

In addition to the alicyclic structure-containing polymer having crystallizability, the crystallizable resin may contain an optional component. Examples of the optional component may include an antioxidant, such as a phenolic antioxidant, a phosphorus-based antioxidant, and a sulfur-based antioxidant; a light stabilizer, such as a hindered amine-based light stabilizer; a wax, such as a petroleum-based wax, a Fischer-Tropsch wax, and a polyalkylene wax; a nucleating agent, such as a sorbitol-based compound, a metal, salt of an organic phosphoric acid, a metal salt of an organic carboxylic acid, kaolin, and talc; a fluorescent brightening agent, such as a diaminostilbene derivative, a coumarin derivative, an azole-based derivative (for example, a benzoxazole derivative, a benzotriazole derivative, a benzimidazole derivative, and a benzothiazole derivative), a carbazole derivative, a pyridine derivative, a naphthalic acid derivative, and an imidazolone derivative; a ultraviolet absorbing agent, such as a benzophenone-based ultraviolet absorbing agent, a salicylic acid-based ultraviolet absorbing agent, and a benzotriazole-based ultraviolet absorbing agent; an inorganic filler, such as talc, silica, calcium carbonate, and glass fibers; a colorant; a flame retardant; a flame retardant promoter; an antistatic agent; a plasticizer; a near-infrared absorbing agent; a lubricant; a filler; and an optional polymer other than the alicyclic structure-containing polymer having crystallizability, such as a soft polymer. As the optional component, one type thereof may be solely used, and two or more types thereof may also be used in combination at any ratio.

[1.2. Properties of Resin Film]

The resin film of the present invention is formed of the aforementioned crystallizable resin. Prior-art films formed of a crystallizable resin generally tend to have poor size stability in a high-temperature environment that is equal to or higher than the glass transition temperature of the crystallizable resin. However, nevertheless the resin film of the present invention is a film formed of the crystallizable resin, it has excellent size stability in a high-temperature environment that is equal to or higher than the glass transition temperature of the crystallizable resin. Specifically, when the resin film of the present invention is heated at 150° C. for 1 hour, the absolute value of thermal size change ratio of the resin film is usually 1% or less, preferably 0.5% or less, and more preferably 0.1% or less in any in-plane direction of the film. The resin film of the present invention is usually shrunk in a high-temperature environment. Therefore, the thermal size change ratio is usually a negative value.

The thermal size change ratio of the resin film may be measured by the following method.

The resin film is cut out to be a square shape with a size of 150 mm×150 mm in an environment at a room temperature of 23° C., to obtain a sample film. This sample film is heated in an oven of 150° C. for 60 minutes, and cooled to 23° C. (room temperature). The lengths of four sides and two diagonal lines of the sample film are measured.

The thermal size change ratio of the sample film is calculated by the following equation (I) on the basis of the measured length of each of four sides. In the equation (I), $L_A$ is the length of each side of the heated sample film.

$$\text{Thermal size change ratio (\%)}=[(L_A-150)/150]\times 100 \quad (I)$$

The thermal size change ratio of the sample film is also calculated by the following equation (II) on the basis of the measured length of each of two diagonal lines. In the equation (II), $L_D$ is the length of each diagonal line of the heated sample film.

$$\text{Thermal size change ratio (\%)}=[(L_D-212.13)/212.13]\times 100 \quad (II)$$

The value whose absolute value is maximum among six calculated values of thermal size change ratio is employed as the thermal size change ratio of the resin film.

It is preferable that the resin film of the present invention has excellent transparency. Specifically, the total light transmittance of the resin film of the present invention is preferably 80% or more, more preferably 85% or more, and particularly preferably 88% or more.

The total light transmittance of the resin film may be measured at a wavelength range of 400 nm to 700 nm with an ultraviolet-visible spectrophotometer.

It is preferable that the resin film of the present invention has low haze. Specifically, the haze of the resin film of the present invention is preferably 5% or less, more preferably 3% or less, and particularly preferably 1% or less.

The haze of the resin film may be obtained by cutting out a randomly selected portion of the resin film to obtain a thin-layer sample having a square shape with a size of 50 mm×50 mm, and then performing measurement for the thin-layer sample with a haze meter.

The resin film of the present invention may have retardation depending on the application. For example, when the resin film of the present invention is used as an optical film such as a phase difference film and an optical compensation film, it is preferable that the resin film has retardation.

The thickness of the resin film of the present invention may be appropriately selected depending on the desire application, and is preferably 1 µm or more, more preferably 3 µm or more, and particularly preferably 10 µm or more, and is preferably 1 mm or less, more preferably 500 µm or less, and particularly preferably 200 µm or less. When the thickness of the resin film is equal to or more than the lower limit value of the aforementioned range, appropriate strength can be obtained. When it is equal to or less than the upper limit value thereof, a long-length film can be wound in the production thereof.

The resin film of the present invention may be used for any purpose. In particular, the resin film of the present invention is suitable, for example, as an optical film, such as an optically isotropic film and a phase difference film, an electrical/electronics film, a substrate film for a barrier film, and a substrate film for an electroconductive film. Examples of the optical film may include a phase difference film for a liquid crystal display device, a polarizing plate protection film, and a phase difference film for a circularly polarizing plate of an organic EL display device. Examples of the electrical/electronics film may include a flexible circuit board and an insulation material for a film capacitor. Examples of the barrier film may include a substrate for an organic EL element, a sealing film, and a sealing film of a solar cell. Examples of the electroconductive film may include a flexible electrode of an organic EL element or a solar cell and a touch panel member.

[2. Method for Producing Resin Film]

The resin film of the present invention may be produced, for example, by a production method including: a step (crystallization step) of setting the temperature of a first film formed of the crystallizable resin containing the alicyclic structure-containing polymer having crystallizability to a temperature which is equal to or higher than the glass transition temperature Tg of the alicyclic structure-containing polymer and equal to or lower than the melting point Tm of the alicyclic structure-containing polymer in a strained state where at least two sides of the first film are held, to obtain a crystallized film; and a step (relaxation step) of relaxing the strain of the crystallized film while the crystallized film is kept flat at a temperature which is equal to or higher than the glass transition temperature Tg of the alicyclic structure-containing polymer and equal to or lower than the melting point Tm of the alicyclic structure-containing polymer. In the production of a resin film using a crystallizable resin which can be shrunk in a high-temperature environment, the resin film of the present invention can be easily produced according to this production method.

Hereinafter, this production method will be described.

[2.1. Preparation of Primary Film]

In the aforementioned production method, a step of preparing a primary film as the first film is performed. The primary film is a film formed of the crystallizable resin. For example, the primary film may be produced by a resin molding method, such as an injection molding method, an extrusion molding method, a press molding method, an inflation molding method, a blow molding method, a calendar molding method, a cast molding method, and a compression molding method. Of these, it is preferable that the primary film is produced by an extrusion molding method since the thickness can be easily controlled.

When the primary film is produced by an extrusion molding method, preferable production conditions in the extrusion molding method are as follows. The temperature of a cylinder (molten resin temperature) is preferably Tm or higher, and more preferably "Tm+20"° C. or higher, and is preferably "Tm+100"° C. or lower, and more preferably "Tm+50"° C. or lower. The temperature of a cast roll is preferably "Tg−50"° C. or higher, and is preferably "Tg+70"° C. or lower, and more preferably "Tg+40"° C. or lower. The temperature of a cooling roll is preferably "Tg−70"° C. or higher, and more preferably "Tg−50"° C. or higher, and is preferably "Tg+60"° C. or lower, and more preferably "Tg+30"° C. or lower. When the primary film is produced under such conditions, a primary film having a thickness of 1 μm to 1 mm can be easily produced. Herein, "Tm" represents the melting point of the alicyclic structure-containing polymer, and "Tg" represents the glass transition temperature of the alicyclic structure-containing polymer.

The primary film produced as described above as it is may be supplied to the crystallization step. Alternatively, the primary film may be, for example, supplied to the crystallization step after an optional treatment such as a stretching treatment.

The method of stretching the primary film is not particularly limited, and any stretching method may be used. Examples of the stretching method may include a uniaxial stretching method such as a method of uniaxially stretching the primary film in a longitudinal direction (longitudinal uniaxial stretching method) and a method of uniaxially stretching the primary film in a width direction (transverse uniaxial stretching method); a biaxial stretching method such as a simultaneous biaxial stretching method of stretching the primary film in the width direction at the same time as stretching the primary film in the longitudinal direction and a sequential biaxial stretching method of stretching the primary film in one of the longitudinal and width directions, followed by stretching the primary film in the other direction; and a method of stretching the primary film in a diagonal direction that is neither parallel nor perpendicular to the width direction (diagonal stretching method).

Examples of the longitudinal uniaxial stretching method may include a stretching method utilizing the difference in peripheral speed between rolls.

Examples of the transverse uniaxial stretching method may include a stretching method using a tenter stretching machine.

Examples of the simultaneous biaxial stretching method may include a stretching method in which the primary film is stretched in the longitudinal direction using a tenter stretching machine provided with a plurality of clips which are provided so as to be movable along a guide rail and can fix the primary film, by increasing intervals between the clips, and simultaneously stretched in the width direction by utilizing a spreading angle of the guide rails.

Examples of the sequential biaxial stretching method may include a stretching method in which the primary film is stretched in the longitudinal direction by utilizing the difference in a peripheral speed between rolls, and then stretched in the width direction by a tenter stretching machine holding both ends of the primary film with clips.

Examples of the diagonal stretching method may include a stretching method in which the primary film is continuously stretched in the diagonal direction using a tenter stretching machine which is capable of applying a feeding force, tensile force, or take-up force at different speeds on left and right sides of the primary film in the longitudinal or width direction.

The stretching temperature in stretching of the primary film is preferably "Tg−30"° C. or higher, and more preferably "Tg−10"° C. or higher, and is preferably "Tg+60"° C. or lower, and more preferably "Tg+50"° C. or lower, relative to the glass transition temperature Tg of the alicyclic structure-containing polymer. When the stretching is performed within such a temperature range, the polymer molecule contained in the primary film can be appropriately oriented.

The stretching ratio in stretching of the primary film may be appropriately selected depending on desired optical properties, thickness, strength, and the like. The stretching ratio is usually 1.1 times or more, more preferably 1.2 times or more, and more preferably 1.5 times or more, and is usually 20 times or less, preferably 10 times or less, and more preferably 5 times or less. Herein, for example, when stretching is performed in a plurality of different directions as in the case of the biaxial stretching method, the stretching ratio is the total stretching ratio represented by the product of stretching ratios in the respective stretching directions. When the stretching ratio is equal to or less than the upper limit of the aforementioned range, a possibility of rupture of the film can be reduced. Therefore, the resin film can be easily produced.

When the primary film is subjected to the stretching treatment as described above, the resin film having desired characteristics can be obtained. Further, generation of large crystal grains can be suppressed in the crystallization step by the stretching treatment of the primary film. Therefore, whitening caused by the crystal grains can be suppressed, and the transparency of the resin film can be increased.

The thickness of the primary film may be optionally set in accordance with the thickness of the resin film. The thickness of the primary film is usually 5 μm or more, and preferably 10 μm or more, and is usually 1 mm or less, and preferably 500 μm or less.

[2.2. Crystallization Step]

After the primary film is prepared, the crystallization step is performed to crystallize the alicyclic structure-containing polymer contained in the primary film. In the crystallization step, the temperature is set to be in the specific temperature range in a strained state where at least two sides of the primary film are held. In this manner, the crystallization treatment of crystallizing the alicyclic structure-containing polymer is performed.

The strained state of the primary film means a state where a tension is applied to the primary film. However, this strained state of the primary film does not include a state where the primary film is substantially stretched. Herein, "substantially stretched" refers to a state where the stretching ratio of the primary film in any direction is usually 1.1 times or more.

When the primary film is held, appropriate holding tools are used for holding. The holding tools may be a holding tool capable of continuously holding the primary film over the entire length of the sides, or intermittently holding the primary film with intervals. For example, the sides of the primary film may be intermittently held by holding tools disposed at specific intervals.

In the crystallization step, the primary film is kept in a strained state where at least two sides of the primary film are held. Thus, deformation due to thermal shrinkage of the primary film at a region between the held sides is prevented. In order to prevent deformation at a wide area of the primary film, it is preferable that sides including two opposite sides are held to keep the region between the held sides in a strained state. For example, in the case of the primary film which has a rectangular sheet piece form, two opposite sides (for example, long sides or short sides) are held to keep the region between the two sides in a strained state. Thus, deformation over the entire surface of the primary film in the sheet piece form can be prevented. In the long-length primary film, two sides at end portions in the width direction (i.e., long sides) are held to keep the region between the two sides in a strained state. Thus, deformation over the entire surface of the long-length primary film can be prevented. In such a primary film whose deformation is prevented as described above, even when a stress in the film is caused by thermal shrinkage, occurrence of deformation such as wrinkle is suppressed. When a stretched film which has been subjected to the stretching treatment is used as the primary film, at least two sides which are orthogonal to the stretching direction (in a case of biaxial stretching, the stretching direction in which the stretching ratio is larger) may be held, whereby deformation is more certainly suppressed.

In order to more surely suppress the deformation in the crystallization step, it is preferable that a larger number of sides are held. For example, regarding the primary film in the sheet piece form, it is preferable that all sides thereof are held. Specifically, it is preferable that four sides of the primary film in the rectangular sheet piece form are held.

It is preferable that the holding tools which can hold the sides of the primary film is a holding tool which does not come into contact with the primary film at a part other than the sides of the primary film. When such holding tools are used, a resin film having more excellent smoothness can be obtained.

It is preferable that the holding tools are those which can fix a relative position between the holding tools in the crystallization step. As the position between the holding tools does not relatively shift in the crystallization step, the holding tools is advantageous for suppressing substantial stretching of the primary film in the crystallization step.

Suitable examples of the holding tools may include grippers which are provided in a frame at specific intervals as holding tools for the rectangular primary film and can grip the sides of the primary film, such as clips. Examples of holding tools for holding two sides at end portions of the width direction of the long-length primary film may include grippers which are provided to a tenter stretching machine and can grip the sides of the primary film.

When the long-length primary film is used, sides at end portions of the primary film in the longitudinal direction (i.e., short sides) may be held. However, instead of holding these sides, both side areas in the longitudinal direction of a region of the primary film which is subjected to the crystallization treatment may also be held. For example, at the both side areas in the longitudinal direction of the region of the primary film which is subjected to the crystallization treatment, a holding device that can hold the primary film so that the primary film is not thermally shrunk but is held in a strained state may be provided. Examples of the holding device may include a combination of two rolls and a combination of an extruder and a take-up roll. By applying with these combination a tension such as a conveyance tension to the primary film, thermal shrinkage of the primary film at the region which is subjected to the crystallization treatment can be suppressed. Therefore, when the combination is used as the holding device, the primary film can be held while the primary film is conveyed in the longitudinal direction. Thereby the resin film can be efficiently produced.

In the crystallization step, the temperature of the primary film is set to a temperature which is equal to or higher than the glass transition temperature Tg of the alicyclic structure-containing polymer and equal to or lower than the melting point Tm of the alicyclic structure-containing polymer in the strained state where at least two sides of the primary film are held as described above. In the primary film which is set to the temperature described above, crystallization of the alicyclic structure-containing polymer proceeds. As a result, a crystallized film containing a crystallized alicyclic structure-containing polymer is obtained by this crystallization step At that time, the crystallized film is kept in the strained state while deformation of the film is prevented. Therefore, the crystallization can be advanced without impairing the smoothness of the crystallized film.

The temperature range in the crystallization step may be optionally set to a temperature range which is equal to or higher than the glass transition temperature Tg of the alicyclic structure-containing polymer and equal to or lower than the melting point Tm of the alicyclic structure-containing polymer, as described above. In particular, it is preferable that the temperature is set to a temperature at which the speed of crystallization is increased. The temperature of the primary film in the crystallization step is preferably "Tg+20"° C. or higher, and more preferably "Tg+30"° C. or higher, and is preferably "Tm−20"° C. or lower, and more preferably "Tm−40"° C. or lower. When the temperature in the crystallization step is equal to or lower than the upper limit of the aforementioned range, clouding of the resin film can be suppressed. Therefore, a resin film suitable for use as an optical film is obtained.

When the temperature of the primary film is set to the temperature described above, the primary film is usually heated. It is preferable that a heating device for this heating is a heating device which can increase the atmospheric temperature around the primary film as a physical contact of the heating device with the primary film is unnecessary. Specific examples of the suitable heating device may include an oven and a heating furnace.

The treatment time of maintaining the temperature of the primary film to the aforementioned temperature range in the crystallization step is preferably 1 second or more, and is more preferably 5 seconds or more, and preferably 30 minutes or less, and more preferably 10 minutes or less. When the crystallization of the alicyclic structure-containing polymer is sufficiently advanced in the crystallization step, the heat resistance of the resin film can be enhanced. When the treatment time is equal to or less than the upper limit of the aforementioned range, clouding of the resin film can be suppressed. Therefore, a resin film suitable for use as an optical film is obtained.

[2.3. Relaxation Step]

In order to effect residual stress removal by thermal shrinkage of the crystallized film obtained in the crystallization step, the relaxation step is performed after the crystallization step. In the relaxation step, while the crystallized film obtained in the crystallization step is kept flat, a relaxation treatment of relaxing the strain of the crystallized film at a temperature in a specific temperature range is performed.

Relaxing the strain of the crystallized film refers to release of the crystallized film from the strained state held by the holding device. When the crystallized film is not strained, the crystallized film may be held by the holding device. When the strain is relaxed as described above, the crystallized film becomes in a state where the crystallized film is thermally shrinkable. In the relaxation step, a stress which may be generated in the resin film during heating is canceled by effecting thermal shrinkage of the crystallized film. Therefore, thermal shrinkage of the resin film of the present invention in a high-temperature environment can be reduced. Accordingly, a resin film having excellent size stability in a high-temperature environment is obtained.

Relaxation of the strain of the crystallized film may be performed at once, and may also be performed over a period of time in a continuous or stepwise manner. In order to suppress occurrence of deformation such as waviness and wrinkle of the resin film to be obtained, it is preferable that the relaxation of the strain is performed in a continuous or stepwise manner.

Relaxation of the strain of the crystallized film is performed while the crystallized film is kept flat. "Keeping the crystallized film flat" refers to an operation of keeping the crystallized film in a flat shape so that deformation such as waviness and wrinkle are not caused. Thus, occurrence of deformation such as waviness and wrinkle of the resin film to be obtained can be suppressed.

The treatment temperature of the crystallized film during the relaxation treatment may be set to a temperature range which is equal to or higher than the glass transition temperature Tg of the alicyclic structure-containing polymer and equal to or lower than the melting point Tm of the alicyclic structure-containing polymer. Specific treatment temperature may be set depending on the type of the alicyclic structure-containing polymer. For example, when the hydrogenated product of the ring-opened polymer of dicyclopentadiene is used as the alicyclic structure-containing polymer, the treatment temperature is preferably "Tg+20"° C. or higher, and more preferably "Tg+30"° C. or higher, and is preferably "Tm−20"° C. or lower and more preferably "Tm−40"° C. or lower. When the relaxation step is performed without cooling after the crystallization step, it is preferable that the treatment temperature of the crystallized film in the relaxation step is the same as the temperature in the crystallization step. Thereby unevenness of the temperature of the crystallized film in the relaxation step can be suppressed, and the productivity of the resin film can be enhanced.

The treatment time of maintaining the temperature of the crystallized film within the temperature range in the crystallization step is preferably 1 second or more, and more preferably 5 seconds or more, and preferably 10 minutes or less. When the treatment time is equal to or more than the lower limit value of the aforementioned range the size stability of the resin film of the present invention in a high-temperature environment can be efficiently enhanced. When it is equal to or less than the upper limit value thereof, the size stability of the resin film of the present invention in a high-temperature environment can be efficiently enhanced, and clouding of the resin film due to advance of crystallization in the relaxation step can be suppressed.

When the crystallized film in a sheet piece form is subjected to the relaxation treatment in the relaxation step as described above, for example, a method of holding four sides of the crystallized film and narrowing intervals between held portions in a continuous or stepwise manner may be used. In this case, the intervals between the held portions at each of four sides of the crystallized film may be simultaneously narrowed. The intervals between the held portions at a part, of the sides may be narrowed, and the intervals between the held portions at another part of the sides may be then narrowed. Further, the intervals between the held portions at a part of the sides may be maintained without narrowing. Alternatively, the intervals between the held portions at a part of the sides may be narrowed in a continuous or stepwise manner, while the intervals between the held portions at another part of the sides may be narrowed at once.

When the long-length crystallized film is subjected to the relaxation treatment in the relaxation step as described above, for example, a method of narrowing intervals between guide rails which can guide clips in the conveyance direction of the crystallized film or narrowing intervals between adjacent clips using a tenter stretching machine may be used.

When the relaxation of the strain of the crystallized film is performed as described above by narrowing of the intervals between the held portions while the crystallized film is held, a degree of narrowing the intervals may be set depending on the magnitude of a stress remaining in the crystallized film obtained in the crystallization step.

For example, when a stretched film which has been subjected to a stretching treatment is used as the primary film, a large stress tends to remain in the crystallized film obtained in the crystallization step. For this reason, it is preferable that the degree of narrowing the intervals to relax the strain of the crystallized film is large. For example, when an unstretched film which is not subjected to a stretching treatment is used as the primary film, a small stress tends to remain in the crystallized film obtained in the crystallization step. For this reason, it is preferable that the degree of narrowing the intervals to relax the strain of the crystallized film is small.

The degree of narrowing the held intervals in the relaxation step is usually 0.1S or more, preferably 0.5S or more, and more preferably 0.7S or more, and is usually 1.2S or less, preferably 1.0S or less, and more preferably 0.95S or less, wherein S is a thermal shrinkage ratio (%) in a state where the crystallized film is not strained at the treatment temperature of the crystallized film in the relaxation step. When the aforementioned thermal shrinkage ratio S is anisotropic such as in a case wherein thermal shrinkage ratios S in two orthogonal directions are different, the degree of narrowing the held intervals can be set within the aforementioned range in each direction. When the degree falls within such a range, the residual stress of the resin film can be sufficiently removed and flatness can be maintained.

The thermal shrinkage ratio S of the crystallized film may be measured by the following method.

The crystallized film is cut out to be a square shape with a size of 150 mm×150 mm in an environment at a room temperature of 23° C., to obtain a sample film. This sample film is heated in an oven the temperature of which is set to the same as the treatment temperature in the relaxation step for 60 minutes, and cooled to 23° C. (room temperature). Then, the lengths of two sides parallel to a direction in which the thermal shrinkage ratio S of the sample film is to be determined are measured.

The thermal shrinkage ratio S of the sample film is calculated by the following equation (III) on the basis of the measured length of each of two sides. In the equation (III), $L_1$ is the length of one of the measured two sides of the heated sample film, and $L_2$ is the length of the other side.

$$\text{Thermal shrinkage ratio } S\ (\%) = [(300 - L_1 - L_2)/300] \times 100 \quad \text{(III)}$$

[2.4. First Example of Crystallization Step and Relaxation Step]

Hereinafter, a first example of the crystallization step and the relaxation step described above will be described. The first example is an example of a method for producing a resin film in a sheet piece form using a primary film in a sheet piece form. The crystallization step and the relaxation step are not limited to the first example.

Figure 2:
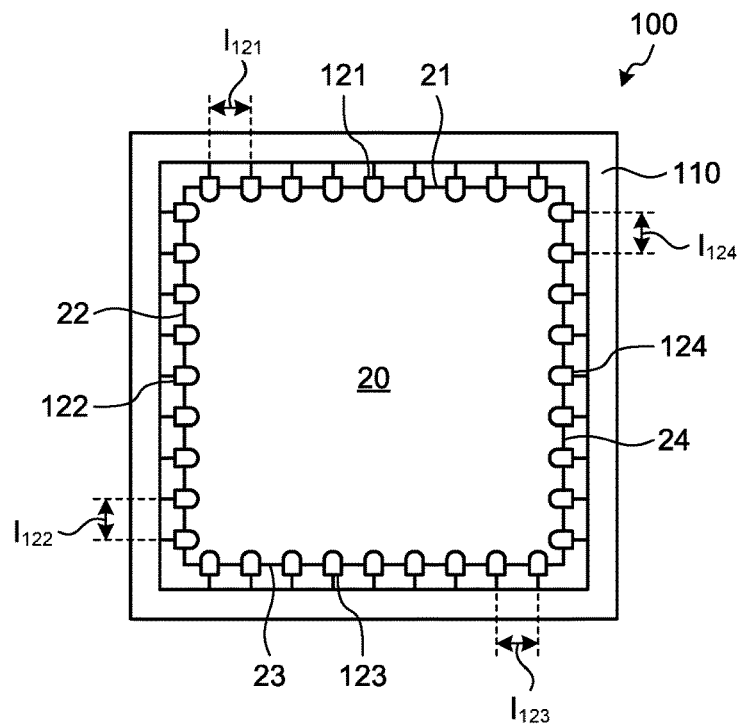
FIG. 2 is a plan view schematically illustrating an example of the holding device.

FIGS. 1 and 2 are plan views schematically illustrating an example of a holding device.

As shown in FIG. 1, a holding device 100 is a device for holding a primary film 10 in a sheet piece form, and includes a frame 110, and clips 121, 122, 123, and 124 as a plurality of holding tools provided in the frame 110 so as to allow adjustment of position. The clips 121, 122, 123, and 124 are provided so as to be capable of gripping sides 11, 12, 13, and 14 of the primary film 10, respectively.

When the crystallization step is performed using the holding device 100, the primary film 10 formed of a resin containing an alicyclic structure-containing polymer is mounted on the holding device 100. Specifically, the primary film 10 is gripped by the clips 121 to 124. Thus, the four sides 11 to 14 of the primary film 10 are held, so that the primary film is strained. The primary film 10 in the strained state is heated in an oven, which is not shown in the drawings, to a temperature in a range which is equal to or higher than the glass transition temperature Tg of the alicyclic structure-containing polymer contained in the primary film 10 and equal to or lower than the melting point Tm of the alicyclic structure-containing polymer.

As a result, the crystallization of the alicyclic structure-containing polymer contained in the primary film 10 proceeds, to obtain a crystallized film 20 as shown in FIG. 2. At that time, the four sides 11 to 14 of the primary film 10 are held so that the primary film 10 is in a strained state. Therefore, deformation due to thermal shrinkage does not occur in the crystallized film 20. Consequently, a stress that acts toward causing thermal shrinkage usually remains in the crystallized film 20.

After that, the crystallized film 20 produced as described above is subjected to a relaxation step. When the crystallization step is completed, sides 21, 22, 23, and 24 of the crystallized film 20 are held by the clips 121, 122, 123, and 124 of the holding device 100. In the relaxation step, while the crystallized film 20 is continuously heated to a temperature in a range which is equal to or higher than the glass transition temperature Tg of the alicyclic structure-containing polymer and equal to or lower than the melting point Tm of the alicyclic structure-containing polymer, intervals $I_{121}$, $I_{122}$, $I_{123}$, and $I_{124}$ between the clips 121 to 124 of the holding device 100 are narrowed. Thus, intervals between portions of the crystallized film 20 held by the clips 121 to 124 are narrowed in a manner of following the size change due to thermal shrinkage of the crystallized film 20. Therefore, the strain of the crystallized film 20 is relaxed while the crystallized film 20 is kept flat, to obtain a resin film in a sheet piece form.

In the resin film thus obtained, a stress in the film which may cause size change in a high-temperature environment is canceled. Consequently, the size stability of the obtained resin film in a high-temperature environment can be improved. Since the alicyclic structure-containing polymer contained in the resin film is crystallized, the resin film usually has excellent heat resistance.

[2.5. Second Example of Crystallization Step and Relaxation Step]

Hereinafter, a second example of the crystallization step and the relaxation step described above will be described. The second example is an example of a method for producing a long-length resin film using a long-length primary film. The crystallization step and the relaxation step are not limited to the second example.

Figure 3:
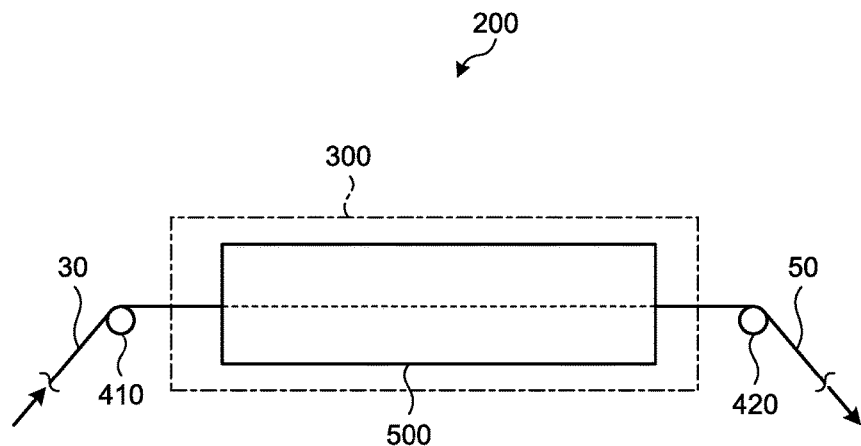
FIG. 3 is a front view schematically illustrating an example of a device of producing a resin film.
Figure 4:
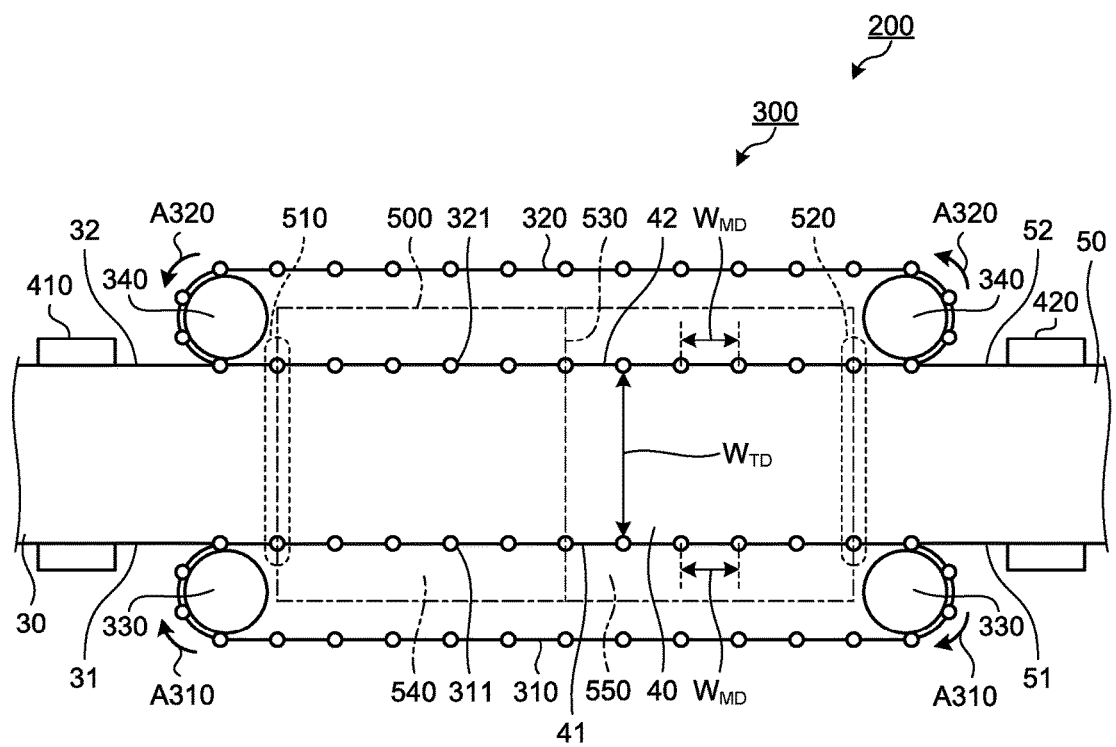
FIG. 4 is a plan view schematically illustrating the example of the device of producing a resin film.

FIG. 3 is a front view schematically illustrating an example of a device of producing a resin film. FIG. 4 is a plan view schematically illustrating the example of the device of producing the resin film.

As shown in FIGS. 3 and 4, a production device 200 includes a tenter stretching machine 300 as a holding device, conveying rolls 410 and 420, and an oven 500 as a heating device.

As shown in FIG. 4, the tenter stretching machine 300 includes endless link devices 310 and 320 which are provided at respective right and left sides of a film conveyance path, and sprockets 330 and 340 for driving the link devices 310 and 320. The link devices 310 and 320 are provided with a plurality of clips 311 and 321 as holding tools, respectively.

The clips 311 and 321 are provided so as to grip sides 31 and 32 at end portions in the width direction of a primary film 30, sides 41 and 42 at end portions in the width direction of a crystallized film 40, and sides 51 and 52 at end portions of a resin film 50, for holding. The clips 311 and 321 are provided so as to be movable with the rotation of the link devices 310 and 320.

The link devices 310 and 320 are provided so as to be rotatable by driving by the sprockets 330 and 340 in a manner shown by arrows A310 and A320 along circulating tracks defined by guide rails which are not shown in the drawings and are provided at each of the both sides of the film conveyance path. The clips 311 and 321 provided in the link devices 310 and 320 are configured so as to be movable along desired circulating tracks at the both sides of the film conveyance path.

By an appropriate optional mechanism, the clips 311 and 32.1 are provided so as to hold two sides 31 and 32 of the primary film 30 near an inlet 510 of the oven 500, move along the film conveyance direction with the rotation of the link devices 310 and 320 while the holding state is maintained, and release the resin film 50 near an outlet 520 of the oven 500.

This tenter stretching machine 300 is configured so as to be capable of freely adjusting intervals $W_{MD}$ in the film conveyance direction between the clips 311 and 321 and intervals $W_{TD}$ in the width direction between the clips 311 and 321. The example shown here is an example in which the intervals $W_{MD}$ and $W_{TD}$ between the clips 311 and 321 as described above are adjustable by the link devices 310 and 320 which are pantograph-type link devices.

Figure 5:
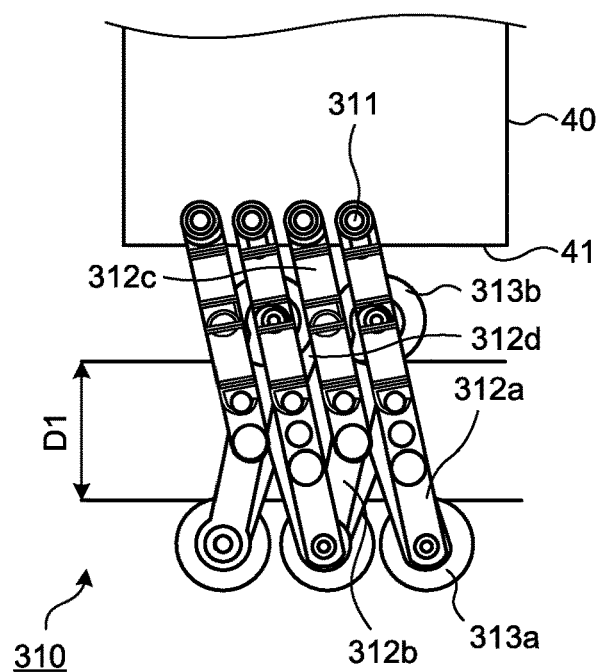
FIG. 5 is a plan view schematically illustrating a part of a link device.
Figure 6:
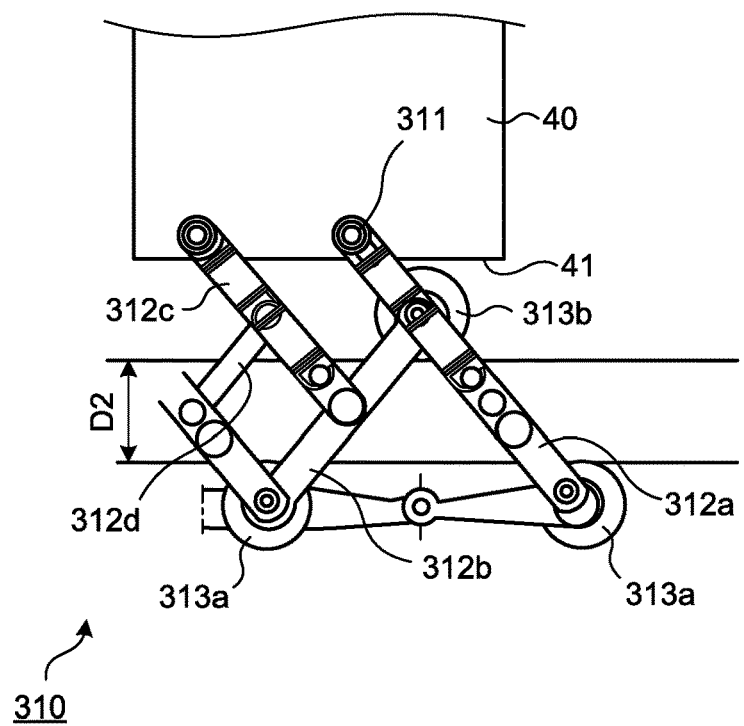
FIG. 6 is a plan view schematically illustrating the part of the link device.

FIGs. 5 and 6 are plan views schematically illustrating a part of the link device 310.

As shown in FIGs. 5 and 6, the link device 310 includes a plurality of link plates 312a to 312d which are linked. In the link device 310 shown in this example, the link plates 312a to 312d are annularly linked. Thus, the shape of the link device 310 is endless.

The link device 310 also includes bearing rolls 313a and 313b. The bearing rolls 313a and 313b are provided so as to pass in grooves formed by a guide rail not shown in the drawings. Therefore, the circulating track of the link device 310 which is rotated along the guide rail may be adjusted by adjusting a track of the guide rail, and a traveling track of the clips 311 provided in the link device 310 may in turn be adjusted. Consequently, this link device 310 is configured so that positions of the clips 311 in the width direction are changeable at any position in the film conveyance direction by adjusting the track of the guide rail. Thus, the intervals WTD in the width direction between the clips 311 and 321 are changeable by changing the positions of the clips 311 in the width direction.

As shown in FIGs. 5 and 6, one unit of the link device 310 includes: (a) the link plate 312a which has a fulcrum on each of the outside bearing roll 313a and the inside bearing roll 313b, extends inwards, and has the clip 311 at an inside end thereof; (b) the link plate 312b which has a common fulcrum on the link plate 312a and the bearing roll 313b and extends to another fulcrum on another bearing roll 313a; (c) the link plate 312c which has a fulcrum between the fulcrums of the link plate 312b, extends therefrom inwards, and has the clip 311 at an inside end thereof; and (d) the link plate 312d which has a fulcrum between the inside end and an outside end of the link plate 312c, extends therefrom outwards, and has a fulcrum on a link plate 312a of a unit adjacent thereto. Herein, the outside means a side remote from the film conveyance path, and the inside means a side close to the film conveyance path. In this link device 310, the state of link pitch can be changed between contraction and expansion states in accordance with distances D1 and D2 of grooves of guide rolls. Therefore, this link device 310 is configured so that the interval $W_{MD}$ between the clips 311 in the film conveyance direction can be changed at any position in the film conveyance direction by adjusting the distances D1 and D2 of the grooves of the guide rolls.

The other link device 320 has the same configuration as that of the link device 310 except that the link device is provided at a side opposite to the link device 310 with respect to the film conveyance path. Therefore, the link device 320 is also configured so that the interval $W_{MD}$ between the clips 321 in the film conveyance direction and positions of the clips 321 in the width direction can be adjusted in the same manner as the link device 310.

As shown in FIGS. 3 and 4, the conveying rolls 410 and 420 are provided at both sides of the tenter stretching machine 300 in the film conveyance direction. The conveying roll 410 provided at the upstream side of the tenter stretching machine 300 is a roll provided so as to convey the primary film 30, and the conveying roll 420 provided at the downstream side of the tenter stretching machine 300 is a roll provided so as to convey the resin film 50. The conveying rolls 410 and 420 are provided so that a specific conveyance tension can be applied to the primary film 30 for conveyance. Therefore, at both sides in the longitudinal direction of the tenter stretching machine 300 (corresponding to a region of the primary film 30 which is subjected to a crystallization treatment), the conveying rolls 410 and 420 can function as a holding device that can hold the primary film 30 so that the primary film 30 is not thermally shrunk but is held in a strained state.

As shown in FIG. 4, the oven 500 has a partition 530, and a space of the oven 500 is divided into a crystallization chamber 540 at the upstream side and a relaxation chamber 550 at the downstream side by the partition 530.

When the resin film 50 is produced using the production device 200 described above, the long-length primary film 30 formed of the resin containing an alicyclic structure-containing polymer is supplied to the tenter stretching machine 300 through the conveying roll 410.

As shown in FIG. 4, the primary film 30 supplied to the tenter stretching machine 300 is gripped by the clips 311 and 321 near the inlet 510 of the oven 500, and as a result, two sides 31 and 32 are held by the clips 311 and 321. The primary film 30 held by the clips 311 and 321 is kept in a strained state by being held by the clips 311 and 321 and being held by the conveying rolls 410 and 420. The primary film 30 is conveyed through the inlet 510 to the crystallization chamber 540 of the oven 500 while being in the strained state.

In the crystallization chamber 540, the primary film 30 is heated to a temperature range which is equal to or higher than the glass transition temperature Tg of the alicyclic structure-containing polymer contained in the primary film 30 and equal to or lower than the melting point Tm of the alicyclic structure-containing polymer, whereby the crystallization step is performed. As a result, the crystallization of the alicyclic structure-containing polymer contained in the primary film 30 proceeds, to obtain the crystallized film 40. At this time, two sides 31 to 32 of the primary film 30 are held, so that the primary film 30 is in a strained state. Further, the primary film 30 is in a strained state by being held by the conveying rolls 410 and 420. Therefore, deformation due to thermal shrinkage does not occur in the crystallized film 40. Consequently, a stress that acts toward causing thermal shrinkage usually remains in the crystallized film 40.

After that, the produced crystallized film 40 is transferred to the relaxation chamber 550 of the oven 500 while two sides 41 and 42 are held by the clips 311 and 321 In the relaxation chamber 550, while the crystallized film 40 is continuously heated to a temperature in a range which is equal to or higher than the glass transition temperature Tg of the alicyclic structure-containing polymer and equal to or lower than the melting point Tm of the alicyclic structure-containing polymer, the intervals $W_{MD}$ between the clips 311 and 321 in the film conveyance direction and the intervals $W_{TD}$ between the clips 311 and 321 in the width direction are narrowed. As a result, the intervals between held portions of the crystallized film 40 by the clips 311 and 321 are narrowed in a manner of following the size change due to thermal shrinkage of the crystallized film 40. Therefore, the strain of the crystallized film 40 is relaxed while the crystallized film 40 is kept flat, so that the long-length resin film 50 is obtained.

The resin film 50 is transferred through the outlet 520 to be sent out of the oven 500. The resin film 50 is released from the clips 311 and 321 near the outlet 520 of the oven 500, transferred through the conveying roll 420, and collected.

In the resin film 50 thus obtained, a stress in the film which may cause size change in a high-temperature environment is canceled. Consequently, the size stability of the obtained resin film 50 in a high-temperature environment can be improved. Since the alicyclic structure-containing polymer contained in the resin film 50 is crystallized, the resin film 50 usually has excellent heat resistance.

[2.6. Optional Step]

In the method for producing a resin film of the present invention, an optional step may be further performed in combination with the crystallization step and the relaxation step described above.

For example, the obtained resin film may be subjected to a surface treatment.

[3. Knurled Film]

The resin film of the present invention has excellent size stability in a high-temperature environment. Taking advantage of such an excellent property, the resin film of the present invention may be subjected to a knurling treatment using a laser beam. Hereinafter, the resin film which has been subjected to the knurling treatment is also referred to as "knurled film".

Figure 7:
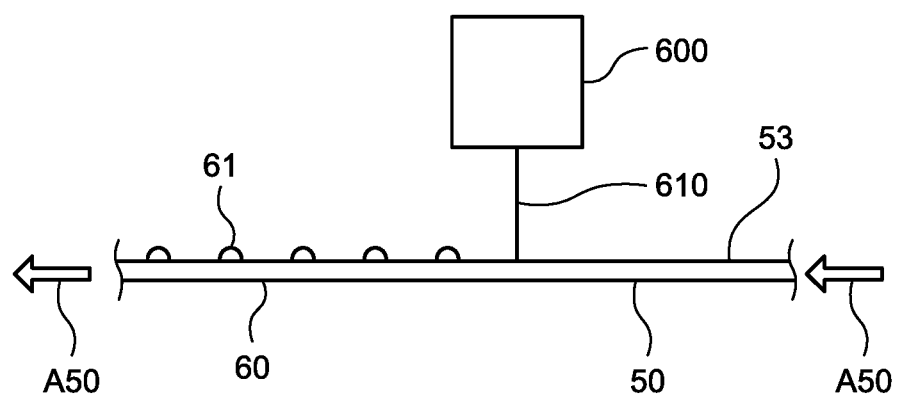
FIG. 7 is a front view schematically illustrating an example of a scheme of producing a knurled film where a resin film is subjected to a knurling treatment.

FIG. 7 is a front view schematically illustrating an example of a scheme of producing a knurled film 60 where the resin film 50 is subjected to a knurling treatment.

As shown in FIG. 7, when the knurled film 60 is produced, the resin film 50 is intermittently irradiated with a laser beam 610 from a laser beam irradiation device 600 while the resin film 50 is continuously conveyed in the longitudinal direction as shown by an arrow A50. When a surface 53 of the resin film 50 is irradiated with the laser beam 610, hot melting or ablation locally occurs on the surface 53 at a region which is irradiated with the laser beam 610. As a result, a protrusion 61 may be formed at the region which is irradiated with the laser beam 610, so that the knurled film 60 having the protrusion 61 is obtained. In this case, occurrence of waviness and wrinkle in the knurled film 60 can be suppressed since the resin film 50 has excellent size stability in a high-temperature environment.

The irradiation time in one irradiation with the laser beam 610 in performing the knurling treatment is preferably 0.001 ms or more, more preferably 0.005 ms or more, and further preferably 0.01 ms or more, and is preferably 0.5 ms or less, more preferably 0.3 ms or less, and further preferably 0.1 ms or less. When the irradiation time with the laser beam 610 falls within this range, the protrusion 61 of suitable size can be easily formed.

As the laser beam 610, an ArF excimer laser beam, a KrF excimer laser beam, a XeCl excimer laser beam, a third or fourth harmonic of a YAG laser, a third or fourth harmonic of a YLF or $YVO_4$ solid state laser, a Ti:S laser beam, a semiconductor laser beam, a fiber laser beam, a carbon dioxide gas laser beam, or the like may be used. Of these, a carbon dioxide gas laser beam is preferable from the viewpoint of productivity improvement with high output.

The output of the laser beam 610 is preferably 1 W or more, more preferably 5 W or more, and further preferably 15 W or more, and is preferably 30 W or less, and more preferably 25 W or less. When the output of the laser beam 610 is equal to or more than the lower limit value of the aforementioned range, insufficiency of irradiation dose of the laser beam 610 is prevented. Thus, the protrusion 61 can be stably formed. When the output of the laser beam 610 is equal to or less than the upper limit value of the aforementioned range, generation of a through hole in the resin film 50 can be prevented, and unintended increase of the protrusion 61 can be suppressed.

The light-condensing diameter of the laser beam 610 (i.e., the diameter for a region irradiated with the laser beam 610) may be set depending on the diameter of the protrusion 61. The light-condensing diameter of the laser beam 610 is usually set to be smaller than the diameter of the protrusion 61. Specific light-condensing diameter is preferably 100 μm or more, and more preferably 200 μm or more, and is preferably 500 μm or less, and more preferably 300 μm or less.

According to the knurling treatment by irradiation with the laser beam 610 as described above, rupture of the resin film 50 during formation of the protrusion 61 can be prevented even when the resin film 50 is thin. Even when the resin film 50 is bent, the resin film 50 at the projection 61 is unlikely to be ruptured. This may be because formation of the protrusion 61 with the laser beam does not incur application of an unnecessary pressing force to the resin film 50, and as a result, a residual stress is unlikely to remain in the resin film 50.

According to the knurling treatment by irradiation with the laser beam 610, the protrusion 61 can be formed without abrasion and contamination of the resin film 50.

Figure 8:
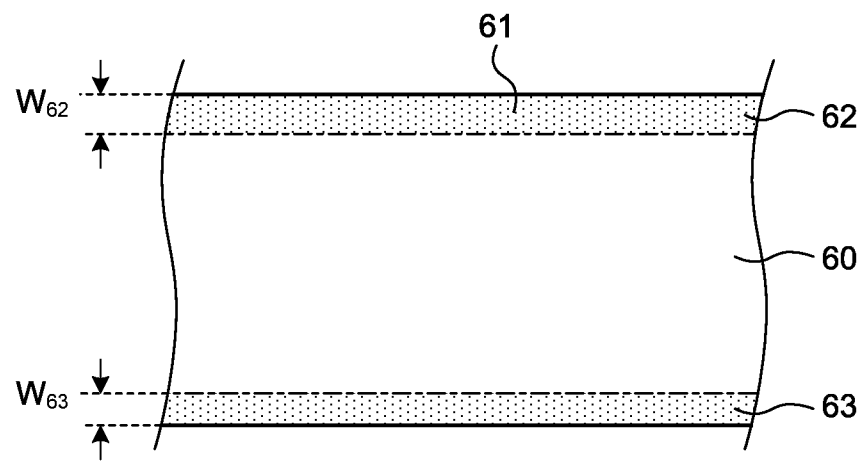
FIG. 8 is a plan view schematically illustrating an example of a knurled film.

FIG. 8 is a plan view schematically illustrating an example of the knurled film 60.

As shown in FIG. 8, the protrusion 61 is usually formed at an end portion in the width direction of the knurled film 60. Therefore, the knurled film 60 has band-shaped regions 62 and 63 where the protrusion 61 is formed at both ends in the width direction of the knurled film 60. The widths $W_{62}$ and $W_{63}$ of the regions 62 and 63 are preferably 1.0 mm or more, more preferably 2.0 mm or more, and particularly preferably 3.0 mm or more, and are preferably 12 mm or less, more preferably 11 mm or less, and particularly preferably 10 mm or less. When the widths $W_{62}$ and $W_{63}$ of the region 62 and 63 where the protrusion 61 is formed are equal to or more than the lower limit value of the aforementioned range, winding deviation of the knurled film 60 can be stably prevented. When they are equal to or less than the upper limit value thereof, a valid region without the protrusion 61 can be widely ensured, and the production cost can be decreased.

When the thickness of the knurled film is about 20 μm or more, the average height of the protrusion 61 is preferably 0.5 μm or more, more preferably 1.0 μm or more, and particularly preferably 2.0 μm or more, and is preferably 5.0 μm or less, more preferably 4.5 μm or less, and particularly preferably 4.0 μm or less. When the thickness of the knurled film is less than 20 μm, the average height of the protrusion 61 is preferably 2.5% or more, more preferably 5% or more, and further preferably 10% or more of the thickness of the knurled film, and is preferably 25% or less, more preferably 22.5% or less, and further preferably 20% or less thereof. When the average height of the protrusion 61 is equal to or more than the lower limit value of the aforementioned range, appearance failures caused by winding deviation, involution, and uneven thickness of the resin film 50 can be effectively suppressed. When it is equal to or less than the upper limit value thereof, a crack can be stably prevented.

The diameter of the protrusion 61 is preferably 150 μm or more, more preferably 200 μm or more, and particularly preferably 250 μm or more, and is preferably 600 μm or less, more preferably 550 μm or less, and particularly preferably 500 μm or less. When the diameter of the protrusion 61 is equal to or more than the lower limit value of the aforementioned range, an effect of the formed protrusion 61 can be stably exerted. When it is equal to or less than the upper limit value thereof, local stress concentration on the protrusion 61 can be avoided.

In the knurling treatment using the laser beam 610, a cavity is usually formed at the center of the protrusion 61. The depth of the cavity is preferably 2% or more, more preferably 4% or more, and particularly preferably 8% or more of the thickness of the knurled film, and is preferably 50% or less, more preferably 40% or less, and particularly preferably 30% or less thereof. When the depth of the cavity falls within the aforementioned range, the effect of the formed protrusion 61 can be stably exerted. Therefore, the appearance of a roll obtained by winding the knurled film 60 can be improved.

The interval between the protrusions 61 in the longitudinal direction of the knurled film 60 is preferably 3.0 mm or more, more preferably 3.5 mm or more, and particularly preferably 4.0 mm or more, and is preferably 7.0 mm or less, more preferably 6.5 mm or less, and particularly preferably 6.0 mm or less. When the interval between the protrusions 61 in the longitudinal direction is equal to or more than the lower limit value of the aforementioned range, blocking of the knurled film 60 can be stably suppressed. When it is equal to or less than the upper limit value thereof, generation of a crack by local stress concentration on the protrusion 61 can be suppressed The interval between the protrusions 61 in the width direction of the knurled film 60 is preferably 0.5 mm or more, more preferably 1.0 mm or more, and particularly preferably 1.5 mm or more, and is preferably 6.0 mm or less more preferably 5.5 mm or less, and particularly preferably 5.0 mm or less. When the interval between the protrusions 61 in the width direction is equal to or more than the lower limit value of the aforementioned range, blocking of the knurled film 60 can be stably suppressed. When it is equal to or less than the upper limit value thereof, a generation of crack by local stress concentration on the protrusion 61 can be suppressed.

[4. Barrier Film]

The resin film of the present invention has excellent size stability in a high-temperature environment, as described above. Thereby film formation can be performed in a preferable manner when a step of forming a film including a high-temperature process, such as a step of forming an inorganic layer, is performed. Specifically, the behavior of the resin film conveyed at the high-temperature process can be stabilized, and thermal damage against the resin film in a high-temperature environment can be suppressed. Thus, a flat, uniform layer can be formed.

Taking advantage of such excellent properties, the resin film of the present invention may be used as a substrate film of a barrier film. This barrier film is a film having a multi-layered structure including the resin film of the present invention, and a barrier layer directly or indirectly provided on the resin film. Since the resin film usually has excellent adhesion property to the barrier layer, the barrier layer can be directly provided on a surface of the resin film, but if necessary, the barrier layer may be provided through a base layer such as a flattening layer.

As a material for the barrier layer, for example, an inorganic material may be used. Examples of the inorganic material may include a material containing a metal oxide, a metal nitride, a metal oxynitride, and a mixture thereof. Examples of metals constituting the metal oxide, the metal nitride, and the metal oxynitride may include silicon and aluminum. In particular, silicon is preferable. Specific examples of compositions of the metal oxide, the metal nitride, and the metal oxynitride may include compositions represented by $SiO_x$ ($1.5<x<1.9$), $SiN_y$ ($1.2<y<1.5$), and $SiO_xN_y$ ($1<x<2$ and $0<y<1$), respectively. When such a material is used, a barrier film having excellent transparency and barrier properties is obtained.

The thickness of the barrier layer is preferably 3 nm or more, and more preferably 10 nm or more, and is preferably 2,000 nm or less, and more preferably 1,000 nm or less.

The upper limit of moisture vapor permeability ratio of the barrier layer is preferably 0.1 $g/m^2 \cdot day$ or less, and more preferably 0.01 $g/m^2 \cdot day$ or less.

The barrier film may be produced by a production method including a step of forming the barrier layer on the resin film of the present invention. The method of forming the barrier layer is not particularly limited. For example, the barrier layer may be formed by a film formation method, such as a vapor deposition method, a sputtering method, an ion plating method, an ion beam assist vapor deposition method, an arc discharge plasma vapor deposition method, a thermal CVD method, and a plasma CVD method. In the arc discharge plasma method, vaporized particles having proper energy are produced. Thus, a high-density barrier layer can be formed. When a plurality of types of components are simultaneously vapor-deposited or sputtered, a barrier layer containing the plurality of types of components can be formed.

Figure 9:
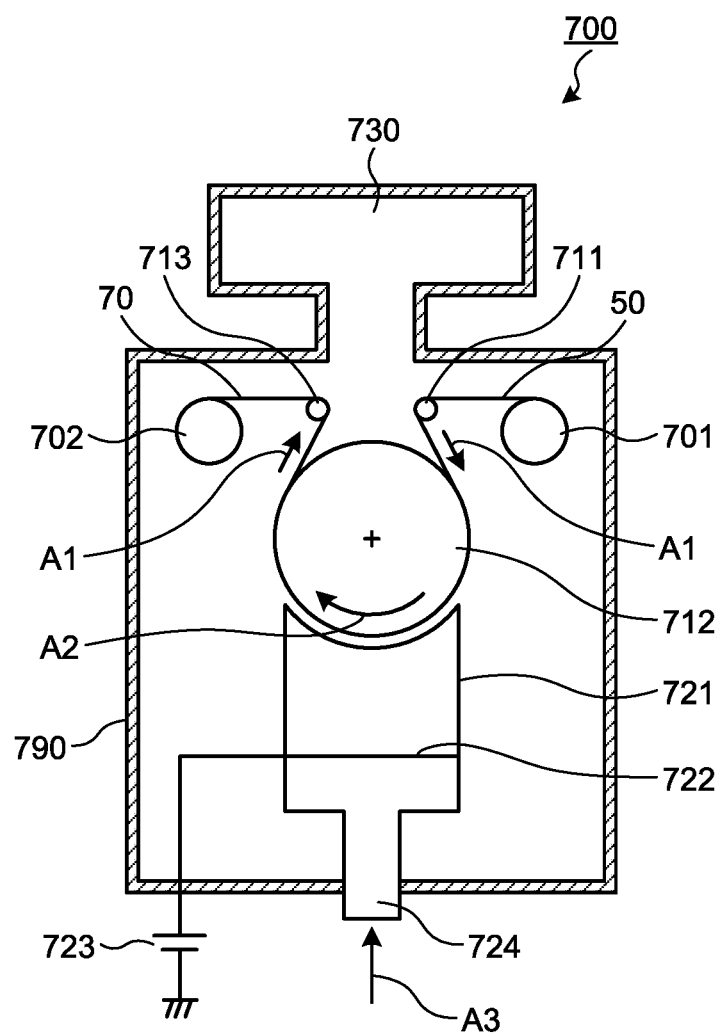
FIG. 9 is a cross-sectional view schematically illustrating an example of a film formation device capable of forming a barrier layer as an inorganic layer by a CVD method.

A specific example of the method of producing the barrier film as described above will be described with reference to an example of a device of performing the method. FIG. 9 is a cross-sectional view schematically illustrating an example of a film formation device capable of forming the barrier layer as an inorganic layer by a CVD method.

As shown in FIG. 9, a film formation device 700 is a plasma CVD device of film-winding type, and performs a series of operations of continuously forming the barrier layer by a CVD method on the resin film 50 which is unwound from a roll 701 of the long-length resin film 50, to obtain a barrier film 70, and winding the barrier film 70 as a roll 702.

The film formation device 700 has a guide roll 711, a can roll 712, and a guide roll 713. The unwound resin film 50 can therewith be guided in a direction shown by an arrow A1, and subjected to a production process. When the positions of the guide roll 711, the can roll 712, and the guide roll 713 and tensions applied to the resin film 50 by the rolls are appropriately adjusted, the resin film 50 is brought into contact with the can roll 712 during guiding by the can roll 712.

The can roll 712 rotates in a direction shown by an arrow A2, and the resin film 50 on the can roll 712 is conveyed in a state of being in the vicinity of a reaction tube 721. In this operation, an electric power is applied to an electrode 722 from a power source 723, the can roll 712 is grounded by an appropriate grounding means (not shown), and a gas of a material for the barrier layer is introduced in a direction of an arrow A3 from a gas introducing port 724. Thus, the barrier layer can be continuously formed on a surface of the resin film 50. Such a series of operations is performed in a space surrounded by a vacuum chamber 790. A pressure in the vacuum chamber 790 may be decreased by an operation of a vacuum exhaust device 730, and adjusted to a pressure suitable for the CVD method.

When the size stability of the resin film 50 in a high-temperature environment is poor during such a process at high output, the resin film 50 is likely to be floated from the can roll 212, and the resin film 50 is likely to be deformed. Therefore, it may become difficult to continuously form a good barrier layer. However, since the resin film 50 of the present invention has excellent size stability in a high-temperature environment, the floating as described above is unlikely to occur. When the resin film 50 of the present invention is used, a flat, uniform barrier layer can thus be continuously formed. Therefore, the barrier film 70 can be efficiently produced. Since the resin film 50 of the present invention has excellent heat resistance, thermal damage against the resin film 50 can be reduced. Therefore, the barrier film 70 having small moisture vapor permeability ratio can be easily produced.

The aforementioned barrier film may have an optional layer in combination with the resin film and the barrier layer. Examples of such an optional layer may include an antistatic layer, a hard coat layer, and a contamination prevention layer. For example, the optional layer like these may be formed by a method of applying a material for the optional layer onto the barrier layer, followed by curing, a method of attaching the layer by thermocompression bonding, or the like.

[5. Electroconductive Film]

The resin film of the present invention has excellent size stability in a high-temperature environment, as described above. Thereby film formation can be performed in a preferable manner when a step of forming a film including a high-temperature process, such as a step of forming an inorganic layer, is performed.

Taking advantage of such excellent properties, the resin film of the present invention may be used as a substrate film of an electroconductive film. This electroconductive film is a film having a multi-layered structure including the resin film of the present invention, and an electroconductive layer directly or indirectly provided on the resin film. Since the resin film usually has excellent adhesion property to the electroconductive layer, the electroconductive layer can be directly provided on a surface of the resin film, but if necessary, the electroconductive layer may be provided through a base layer such as a flattening layer.

As a material for the electroconductive layer, for example, an electroconductive inorganic material may be used. In particular, a material which can form a transparent electroconductive layer is preferably used. Examples of the inorganic material may include ITO (indium tin oxide), IZO (indium zinc oxide), ZnO (zinc oxide), IWO (indium tungsten oxide), ITiO (indium titanium oxide), AZO (aluminum zinc oxide), GZO (gallium zinc oxide), XZO (special zinc-based oxide), and IGZO (indium gallium zinc oxide).

The thickness of the electroconductive layer is preferably 30 nm or more, and more preferably 50 nm or more, and is preferably 250 nm or less, and more preferably 220 nm or less.

When the electroconductive layer is formed, a function of an electrode can be imparted to an electroconductive film thus obtained. The surface resistivity of a surface of the electroconductive film on a side of the electroconductive layer may be appropriately selected in accordance with a purpose of use, and is usually 1,000 Ω/sq or less, and preferably 100 Ω/sq or less.

The electroconductive film may be produced by a production method including a step of forming the electroconductive layer on the resin film of the present invention. The method of forming the electroconductive layer is not particularly limited. For example, the electroconductive layer may be formed by a film formation method such as a sputtering method and a vapor deposition method. As described above, the resin film of the present invention has excellent size stability and heat resistance in a high-temperature environment. Therefore, the film can be formed at high output, and a flat electroconductive layer having excellent electroconductivity can be quickly formed.

The electroconductive film described above may have an optional layer, such as an optical functional layer and a barrier layer in combination with the resin film and the electroconductive layer.

EXAMPLE

Hereinafter, the present invention will be specifically described with reference to Examples. However, the present invention is not limited to the following Examples. The present invention may be optionally modified and practiced without departing from the scope of claims of the present invention and the scope of their equivalents.

In the following description, "%" and "part" that represent an amount are on the basis of weight unless otherwise specified. Further, the operations described below were performed under the conditions of normal temperature and normal pressure unless otherwise specified. In the following description, "sccm" is a unit of flow rate of a gas, and represents the amount of a gas which flows per minute, the amount being represented by volumes ($cm^3$) of the gas at 25° C. and 1 atm.

[Evaluation Method]
[Method for Measuring Weight Average Molecular Weight and Number Average Molecular Weight]

The weight average molecular weight and the number average molecular weight of the polymer were measured in terms of polystyrene by using a gel permeation chromatography (GPC) system ("HLC-8320" manufactured by Tosoh Corporation). In the measurement, an H-type column (manufactured by Tosoh Corporation) was used as a column, and tetrahydrofuran was used as a solvent. The measurement was performed at a temperature of 40° C.

[Method for Measuring Glass Transition]Temperature Tg and Melting Point Tm

A sample that had been heated to 300° C. in a nitrogen atmosphere was rapidly cooled with liquid nitrogen, and the glass transition temperature Tg and the melting point Tm of the sample were each determined by increasing the temperature at 10° C./min using a differential, operation calorimeter (DSC).

[Method for Measuring Hydrogenation Ratio of Polymer]

The hydrogenation ratio of the polymer was measured by $^1$H-NMR measurement at 145° C. using orthodichlorobenzene-$d^4$ as a solvent.

[Method for Measuring Ratio of Racemo Diads of Polymer]

The polymer was subjected to $^{13}$C-NMR measurement at 200° C. by an inverse-gated decoupling method using orthodichlorobenzene-$d^4$ as a solvent. From the result of the $^{13}$C-NMR measurement, the ratio of racemo diads of the polymer was obtained on the basis of an intensity ratio of the signal at 43.35 ppm derived from meso diads and the signal at 43.43 ppm derived from racemo diads using the peak of orthodichlorobenzene-$d^4$ at 127.5 ppm as a reference shift.

[Method for Measuring Total Light Transmittance of Film]

The total light transmittance of the film was measured at a wavelength range of 400 nm to 700 nm with an ultraviolet-visible spectrophotometer ("V-550" manufactured by JASCO Corporation).

[Method for Measuring Haze of Film]

The film of a randomly selected portion was cut out to obtain a thin film sample having a square shape with a size of 50 mm×50 mm. Subsequently, the haze of the thin film sample was measured with a haze meter ("NDH5000" manufactured by Nippon Denshoku Industries Co., Ltd.).

[Method for Measuring Thermal Size Change Ratio of Film]

The film was cut out to be a square shape with a size of 150 mm×150 mm in an environment at a room temperature of 23° C., to obtain a sample film. This sample film was heated in an oven of 150° C. for 60 minutes, and cooled to 23° C. (room temperature). The lengths of four sides and two diagonal lines of the sample film were measured.

The thermal size change ratio of the sample film was calculated by the following equation (I) on the basis of the measured length of each of four sides. In the equation (I), $L_A$ is the length of each side of the heated sample film.

$$\text{Thermal size change ratio (\%)}=[(L_A-150)/150]\times 100 \quad (I)$$

The thermal size change ratio of the sample film was also calculated by the following equation (II) on the basis of the measured length of each of two diagonal lines. In the equation (II), $L_D$ is the length of each diagonal line of the heated sample film.

$$\text{Thermal size change ratio (\%)}=[(L_D-212.13)/212.13]\times 100 \quad (II)$$

The value whose absolute value was maximum among six calculated values of thermal size change ratio was employed as the thermal size change ratio of the film.

[Method for Measuring Thermal Shrinkage Ratio S of Crystallized Film]

The crystallized film was cut out to be a square shape with a size of 150 mm×150 mm in an environment at a room temperature of 23° C., to obtain a sample film. This sample film was heated in an oven the temperature of which was set to the same as the treatment temperature in the relaxation step for 60 minutes, and cooled to 23° C. (room temperature). Then, the lengths of two sides parallel to a direction in which the thermal shrinkage ratio S of the sample film is to be determined were measured.

The thermal shrinkage ratio S of the sample film was calculated by the following equation (III) on the basis of the measured length of each of two sides. In the equation (III), $L_1$ is the length of one of the measured two sides of the heated sample film, and $L_2$ is the length of the other side.

$$\text{Thermal shrinkage ratio } S (\%)=[(300-L_1-L_2)/300]\times 100 \qquad (III)$$

[Method for Evaluating Laser Processability of Film]

The film was cut out to be a square shape with a size of 30 mm×30 mm, to obtain a sample film. A region of 20 mm×20 mm at the center of the sample film was irradiated with a laser beam, to form a plurality of protrusions. In this operation, as an irradiation device of a laser beam, a $CO_2$ laser beam irradiation device ("MLZ9510" manufactured by Keyence Corporation, laser wavelength: 10.6 μm) was used. The irradiation intensity of a laser beam was 20 W. The irradiation time in one irradiation of a laser beam and the size of a region where the laser beam impinged on the sample film were adjusted so as to obtain the protrusions with a diameter of 200 μm in a dot shape.

Thus, the protrusions were formed on the sample film in the dot shape where a total of 36 protrusions of 6 lines and 6 columns were disposed at intervals of 4 mm in each of lengthwise and transverse directions.

Subsequently, the sample film was placed on a flat stage with a surface of the sample film which was irradiated with the laser beam faced upward. On the sample film, a glass plate with a thickness of 1.2 mm and a size of 50 mm in length and 50 mm in width was placed. The thickness of the sample film at each of the formed protrusions in this state (i.e., the height from the stage to an apex of the protrusion) was measured with an ultra-deep microscope ("VK-9500" manufactured by Keyence Corporation). A difference between the maximum and minimum values of the measured values was determined as a deformation amount of the film by the irradiation with the laser beam.

This deformation amount represents a degree of flatness which is lost by bending of the film when the film is locally shrunk by heat generated in the film in which the laser beam is absorbed. Therefore, a smaller deformation amount represents that the film has better laser processability.

[Production Example 1: Production of Hydrogenated Product of Ring-Opened Polymer of Dicyclopentadiene]

A metal pressure-resistant reaction vessel was sufficiently dried and the inside thereof was replaced with nitrogen. To the metal pressure-resistant reaction vessel, 154.5 parts of cyclohexane, 42.8 parts of a cyclohexane solution of dicyclopentadiene (endo isomer content: 99% or more) in a concentration of 70% (amount of dicyclopentadiene: 30 parts), and 1.9 parts of 1-hexene were added, and heated to 53° C.

0.061 parts of an n-hexane solution of diethylaluminum ethoxide in a concentration of 19% was added to a solution prepared by dissolving 0.014 parts of tetrachloro tungsten phenylimide(tetrahydrofuran) complex in 0.70 parts of toluene, and the mixture was stirred for 10 minutes to prepare a catalyst solution.

The catalyst solution was added to the pressure-resistant reaction vessel to initiate a ring-opening polymerization reaction. After that, the reaction was performed for 4 hours while the temperature was maintained at 53° C., to obtain a solution of a ring-opened polymer of dicyclopentadiene.

The number-average molecular weight (Mn) and the weight-average molecular weight (Mw) of the obtained ring-opened polymer of dicyclopentadiene were 8,750 and 28,100, respectively, and the molecular weight distribution (Mw/Mn) calculated therefrom was 3.21.

To 200 parts of the obtained solution of the ring-opened polymer of dicyclopentadiene, 0.037 parts of 1,2-ethanediol as a terminator was added. The mixture was heated to 60° C. and stirred for 1 hour, to terminate the polymerization reaction. To the mixture, 1 part of a hydrotalcite-like compound ("KYOWAAD (registered trademark) 2000" available from Kyowa Chemical Industry Co., Ltd.) was added. The mixture was heated to 60° C. and stirred for 1 hour. After that, 0.4 parts of a filtration aid ("RADIOLITE (registered trademark) #1500" available from Showa Chemical Industry Co., Ltd.) was added, and the mixture was filtered through a PP pleats cartridge filter ("TCP-HX" available from Advantec Toyo Kaisha, Ltd.) to separate the adsorbent and the solution.

To 200 parts of the filtered solution of the ring-opened polymer of dicyclopentadiene (amount of the polymer: 30 parts), 100 parts of cyclohexane was added. 0.0043 parts of chlorohydridecarbonyl tris(triphenylphosphine) ruthenium was then added, and a hydrogenation reaction was performed at a hydrogen pressure of 6 MPa and 180° C. for 4 hours. As a result, a reaction liquid containing a hydrogenated product of the ring-opened polymer of dicyclopentadiene was obtained. This reaction liquid was a slurry solution in which the hydrogenated products were precipitated.

The hydrogenated products contained in the reaction liquid were separated from the solution using a centrifugal separator, and dried under reduced pressure at 60° C. for 24 hours, to obtain 28.5 parts of the hydrogenated products of the ring-opened polymer of dicyclopentadiene having crystallizability. The hydrogenation ratio of the hydrogenated products was 99% or more, the glass transition temperature Tg was 93° C., the melting point (Tm) was 262° C., and the ratio of racemo diads was 89%.

[Production Example 2 Production of Unstretched Film]

To 100 parts of the hydrogenated products of the ring-opened polymer of dicyclopentadiene obtained in Production Example 1, 1.1 parts of an antioxidant (tetrakis[methylene-3-(3',5'-di-tert-butyl-4'-hydroxyphenyl)propionate]methane; "Irganox (registered trademark) 1010" available from BASF Japan Ltd.) was added, to obtain a resin as a material for the film.

The aforementioned resin was put into a twin-screw extruder ("TEM-37B" manufactured by Toshiba Machine Co., Ltd.) provided with four die holes each having an inner diameter of 3 mmφ. The resin was molded by hot melt extrusion molding using the twin-screw extruder, to obtain a molded article in a strand shape. The molded article was finely cut with a strand cutter, to obtain pellets of the resin. The operation conditions of the twin-screw extruder are as follows.

Barrel setting temperature: 270° C. to 280° C.
Die setting temperature: 250° C.
Screw rotation speed: 145 rpm
Feeder rotation speed: 50 rpm Subsequently, the obtained pellets were supplied to a hot melt extrusion film-molding machine provided with a T die. A long-length unstretched film (thickness: 150 μm, width: 120 mm) formed of the aforementioned resin was produced using this film-molding machine by a method in which the film was wound into a roll at a speed of 2 m/min. The operation conditions of the film-molding machine are as follows.

Barrel setting temperature: 280° C. to 290° C.
Die temperature: 270° C.
Screw rotation speed: 30 rpm The haze of the obtained unstretched film was measured and found to be 0.3%.

EXAMPLE 1

[1-1. Stretching Step]

A randomly selected portion of the long-length unstretched film obtained in Production Example 2 was cut out to be a square shape with a size of 90 mm×90 mm. The cutting was performed so that sides of the cut square of the unstretched film were parallel to the longitudinal or width direction of the long-length unstretched film. The cut unstretched film was set in a compact stretching machine ("EX10-B type" manufactured by Toyo Seiki Seisaku-sho, Ltd.). The compact stretching machine was provided with a plurality of clips for gripping four sides of the film, and was configured so that the film can be stretched by moving the clips. Using the compact stretching machine, the unstretched film was stretched at a stretching ratio of two times in a lengthwise direction corresponding to the longitudinal direction of the long-length unstretched film, and then stretched at a stretching ratio of two times in a transverse direction corresponding to the width direction of the long-length unstretched film, to obtain a stretched film as a primary film. The operation conditions of the compact stretching machine are as follows.

Stretching speed: 10,000 mm/min
Stretching temperature: 100° C.

[1-2. Crystallization Step]

A frame made of SUS capable of fixing four sides of the primary film was prepared. Four sides of the aforementioned primary film were held by the frame, so that the primary film was kept at a strained state. The primary film was then subjected to a heating treatment in an oven at 200° C. for 30 seconds, to perform a crystallization step of crystallizing the hydrogenated product of the ring-opened polymer of dicyclopentadiene contained in the primary film. Thus, a crystallized film was obtained.

The haze of the obtained crystallized film was measured and found to be 0.4%. The thermal shrinkage ratio S of the crystallized film at 200° C. was measured by the aforementioned method, and found to be 3.2% in the lengthwise direction of the crystallized film and 4.1% in the transverse direction.

[1-3. Relaxation Step]

Four sides of the obtained crystallized film were gripped by the clips of the compact stretching machine. Thus, the crystallized film was set in the compact stretching machine. A relaxation step of relaxing the strain of the crystallized film was performed at 200° C. while the crystallized film was kept flat, to obtain a resin film. At this relaxation step, the clips of the compact stretching machine were moved in an in-plane direction of the crystallized film, to decrease a distance between the clips, to thereby accomplish relaxation of the strain of the crystallized film. The distance between the clips was decreased to 3.0% in the lengthwise direction of the crystallized film, and to 4.0% in the transverse direction of the crystallized film, over 30 seconds.

The thermal size change ratio of the obtained resin film and the deformation amount of the film by irradiation with a laser beam were measured by the aforementioned methods.

[1-4. Step of Producing Barrier Film]

A film formation device capable of forming a barrier layer on one surface of the resin film by a CVD method was prepared. The film formation device was a plasma CVD device of film-winding type which can form a desired barrier layer on a surface of a film conveyed in the device, like the film formation device shown in FIG. 9. However, the film formation device used herein has a structure by which the barrier layer can be formed on the resin film fixed on a carrier film to form the barrier layer on the resin films in a sheet piece form. Specifically, the prepared film formation device has a structure such that, when the resin film is fixed on a long-length carrier film continuously conveyed in the device, a desired barrier layer can be formed on a surface of the resin film. As the carrier film, a polyethylene terephthalate film was used.

The obtained resin film was cut out to be a square shape with a size of 100 mm×100 mm. The cut resin film was fixed on the carrier film with a polyimide tape. The carrier film was supplied to the film formation device, to form a barrier layer on one surface of the resin film. The film formation conditions in this operation were a tetramethylsilane (TMS) flow rate of 10 sccm, an oxygen ($O_2$) flow rate of 100 sccm, an output of 0.8 kW, a total pressure of 5 Pa, and a film conveyance rate of 0.5 m/min. Film formation was performed by RF plasma discharge.

As a result, a barrier layer formed of $SiO_x$ with a thickness of 300 nm was formed on one surface of the resin film, to obtain a barrier film having the barrier layer and the resin film.

For the obtained barrier film, appropriateness of film formation, curl amount, and adhesion were evaluated by the following methods.

(Method for Evaluating Appropriateness of Film Formation of Barrier Layer)

The surface state of the obtained barrier film was observed, and appropriateness of film formation was evaluated in accordance with the following evaluation criteria.

Good: the film surface was flat or simply curled, and deformation such as wrinkle and waviness did not occur.

Poor: on the film surface, deformation such as wrinkle and waviness occurred.

(Method for Evaluating Curl Amount of Barrier Film)

On a flat stage, the obtained barrier film was placed with the side of the barrier layer faced downward. The heights from the stage to the four corners of the barrier film which were floated from the stage were measured. The average of the measured heights was employed as the curl amount.

(Method for Evaluating Adhesion of Barrier Layer to Resin Film)

The obtained barrier film was subjected to a cross-cut test of 100 pieces of 1-mm size squares in accordance with JIS K5400. A state of the barrier layer peeled by a cellophane tape (specified by JIS Z1522) was observed. In this evaluation, the cellophane tape attached to the side of the barrier layer was peeled, and the number of squares of the barrier layer which were not peeled from the resin film was counted. Larger number of the squares of the barrier layer which were not peeled from the resin film is indicative of better adhesion of the barrier layer to the resin film.

[1-5. Step of Producing Electroconductive Film]

A film formation device capable of forming an electroconductive layer on one surface of the resin film by a sputtering method was prepared. This film formation device was a magnetron sputtering device of film-winding type capable of forming a desired electroconductive layer on a surface of the resin film which was fixed on a long-length carrier film continuously conveyed in the device. As the carrier film, a polyethylene terephthalate film was used.

The obtained resin film was cut out to be a square shape with a size of 100 mm×100 mm. The cut resin film was fixed on the carrier film with a polyimide tape. The carrier film was supplied to the film formation device, to form an electroconductive layer on one surface of the resin film. In this operation, an $In_2O_3$-$SnO_2$ ceramic target was used as a sputtering target. The film formation conditions were an argon (Ar) flow rate of 150 sccm, an oxygen ($O_2$) flow rate of 10 sccm, an output of 4.0 kw, a degree of vacuum of 0.3 Pa, and a film conveyance rate of 0.5 m/min.

As a result, a transparent electroconductive layer formed of ITO with a thickness of 100 nm was formed on the surface of the resin film, to obtain an electroconductive film having the electroconductive layer and the resin film.

For the obtained electroconductive film, appropriateness of film formation, curl amount, and adhesion were evaluated by the following methods.

(Method for Evaluating Appropriateness of Film Formation of Electroconductive Layer)

The surface state of the obtained electroconductive film was observed, and appropriateness of film formation was evaluated in accordance with the following evaluation criteria.

Good: the film surface was flat or simply curled, and deformation such as wrinkle and waviness did not occur.

Poor: on the film surface, deformation such as wrinkle and waviness occurred.

(Method for Evaluating Curl Amount of Electroconductive Film)

On a flat stage, the obtained electroconductive film was placed with the side of the electroconductive layer faced downward. The heights from the stage to the four corners of the electroconductive film which were floated from the stage were measured. The average of the measured heights was employed as the curl amount.

(Method for Evaluating Adhesion of Electroconductive Layer to Resin Film)

The obtained electroconductive film was subjected to a cross-cut test of 100 pieces of 1-mm size squares in accordance with JIS K5400. A state of the electroconductive layer peeled by a cellophane tape (specified by JIS Z1522) was observed. In this evaluation, the cellophane tape attached to the side of the electroconductive layer was peeled, and the number of squares of the electroconductive layer which were not peeled from the resin film was counted. Larger number of squares of the electroconductive layer which were not peeled from the resin film is indicative of better adhesion of the electroconductive layer to the resin film.

EXAMPLE 2

Decreasing of the distance between clips was performed over 180 seconds in [1-3. Relaxation Step] described above. Except for the aforementioned change, the same operation as in Example 1 was performed.

EXAMPLE 3

The distance between clips in the lengthwise direction of the crystallized film was not decreased in [1-3. Relaxation Step] described above. That is, the decrease ratio of distance between chucks in the lengthwise direction of the crystallized film was changed to 0.0% in the relaxation step. Except for the aforementioned change, the same operation as in Example 1 was performed.

EXAMPLE 4

In [1-3. Relaxation Step] described above, the temperature at which the distance between clips was decreased was changed to 170° C., decreasing of the distance between clips was performed over 60 seconds, and the decrease ratio of distance between clips in the crystallized film was changed to 2.5% in the lengthwise direction and to 3.5% in the transverse direction. Except for the aforementioned changes, the same operation as in Example 1 was performed.

EXAMPLE 5

In [1-2. Crystallization Step] described above, an unstretched film before stretching was used as the primary film in place of the stretched film produced in [1-1. Stretching Step]. Further, in [1-2. Crystallization Step] described above, the heating temperature was changed to 220° C. Still further, in [1-3. Relaxation Step] described above, the decrease ratio of the distance between clips in each of the lengthwise and transverse directions of the crystallized film was changed to 1.0%. Except for the aforementioned changes, the same operation as in Example 1 was performed.

COMPARATIVE EXAMPLE 1

The [1-3. Relaxation Step] was not performed and the crystallized film as it was used as the resin film. Except for the aforementioned changes, the same operation as in Example 1 was performed.

In Comparative Example 1, when the resin film was irradiated with a laser beam for evaluation of leaser processability, the resin film was rolled and largely deformed as a result of local heating of the resin film by the laser beam.

In Comparative Example 1, the barrier film and the electroconductive film were largely curled and rounded. Therefore, it was impossible to perform the evaluation of curl amount.

COMPARATIVE EXAMPLE 2

In [1-3. Relaxation Step] described above, the decrease ratio of distance between clips in the crystallized film was changed to 4.5% in the lengthwise direction and to 6.0% in the transverse direction to thereby perform an excessive relaxation of the strain of the crystallized film. Except for the aforementioned changes, the same operation as in Example 1 was performed.

In Comparative Example 2, the distance between clips in [1-3. Relaxation Step] was excessively decreased. As a result, the crystallized film was not kept flat during relaxation of strain, and deformation such as waviness occurred in the obtained resin film. Consequently, it was impossible to produce a barrier film and an electroconductive film.

COMPARATIVE EXAMPLE 3

In [1-3. Relaxation Step] described above, the decrease ratio of distance between clips in the crystallized film was changed to 1.5% in the lengthwise direction and to 2.0% in the transverse direction to thereby insufficiently perform relaxation of the strain of the crystallized film. Except for the aforementioned changes, the same operation as in Example 1 was performed.

COMPARATIVE EXAMPLE 4

In [1-3. Relaxation Step] described above, the temperature at which the distance between clips was decreased was changed to 110° C. and decreasing of the distance between clips was performed over 180 seconds. Except for the aforementioned changes, the same operation as in Example 1 was performed.

"Transmittance": a total light transmittance.
"Film deformation amount": a deformation amount of the resin film by irradiation with a laser beam which is measured for evaluation of laser processability of the resin film.

TABLE 1

[Configurations of Examples and Comparative Examples]

| | | Crystallization step | | Relaxation step | | | |
|---|---|---|---|---|---|---|---|
| | | Temperature | Time | Temperature | Time | Deacrease ratio (%) | |
| | Stretching | (° C.) | (sec.) | (° C.) | (sec.) | Transverse | Lengthwise |
| Ex. 1 | Sequential | 200 | 30 | 200 | 30 | 4.0 | 3.0 |
| Ex. 2 | Biaxial | 200 | 30 | 200 | 180 | 4.0 | 3.0 |
| Ex. 3 | Stretching | 200 | 30 | 200 | 30 | 4.0 | 0.0 |
| Ex. 4 | | 200 | 30 | 170 | 60 | 3.5 | 2.5 |
| Ex. 5 | None | 220 | 30 | 200 | 30 | 1.0 | 1.0 |
| Comp. Ex. 1 | Sequential Biaxial | 200 | 30 | | None | | |
| Comp. Ex. 2 | Stretching | 200 | 30 | 200 | 30 | 6.0 | 4.5 |
| Comp. Ex. 3 | | 200 | 30 | 200 | 30 | 2.0 | 1.5 |
| Comp. Ex. 4 | | 200 | 30 | 110 | 180 | 4.0 | 3.0 |

TABLE 2

[Results of Examples and Comparative Examples]

| | Resin film | | | | Barrier film | | | Electroconductive film | | |
|---|---|---|---|---|---|---|---|---|---|---|
| | Haze (%) | Transmittance (%) | Absolute value of thermal size change ratio (%) | Film deformation amount (μm) | Appropriateness of film formation | Curl amount (mm) | Adhesion | Appropriateness of film formation | Curl amount (mm) | Adhesion |
| Ex. | | | | | | | | | | |
| 1 | 0.4 | 89 | 0.05 | 4 | Good | 18 | 100/100 | Good | 13 | 100/100 |
| 2 | 1.1 | 87 | 0.4 | 6 | Good | 22 | 100/100 | Good | 19 | 100/100 |
| 3 | 0.4 | 89 | 0.9 | 7 | Good | 32 | 100/100 | Good | 27 | 100/100 |
| 4 | 0.4 | 89 | 0.7 | 6 | Good | 25 | 100/100 | Good | 22 | 100/100 |
| 5 | 0.6 | 88 | 0.02 | 3 | Good | 21 | 100/100 | Good | 15 | 100/100 |
| Comp. Ex. | | | | | | | | | | |
| 1 | 0.4 | 89 | 3.9 | 23 | Poor | *1 | 32/100 | Poor | *1 | 61/100 |
| 2 | 0.4 | 89 | *2 | *2 | | *3 | | | *3 | |
| 3 | 0.4 | 89 | 1.3 | 14 | Poor | *1 | 64/100 | Poor | 30 | 70/100 |
| 4 | 0.4 | 89 | 3.2 | 19 | Poor | *1 | 47/100 | Poor | *1 | 62/100 |

*1 The film was largely curled and rounded, and it was thus impossible to perform the evaluation of curl amount.
*2 Waviness deformation occurred in the film in lengthwise and transverse direction, and it was thus impossible to perform measurement.
*3 The resin film could not be fixed on the carrier film in a flat state, and film formation was thus not performed.

[Results]

Configurations of Examples and Comparative Examples are shown in Table 1, and results thereof are shown in Table 2. Abbreviations in the following Tables mean as follows.

"Decrease ratio": the ratio of decreasing the distance between clips in a compact stretching machine in which the crystallized film was set in the relaxation step. The distance between clips before movement of the clips was 100%.

[Discussion]

The absolute values of the thermal size change ratios measured in Examples 1 to 5 are each the maximum value among absolute values of thermal size change ratios measured in many directions. When it is found that the absolute value of the thermal size change ratio is sufficiently small, it can be confirmed that the absolute value of the thermal size change ratio of the resin film is small in any direction. In the resin films of Examples 1 to 5, the absolute values of the thermal size change ratios are small. This shows that the resin films of Examples 1 to 5 have excellent size stability in a high-temperature environment.

It is confirmed that when the resin film of each of Examples 1 to 5 is used as a substrate film for forming a barrier layer, a good barrier film is obtained, and when the resin film is used as a substrate film for forming an electroconductive layer, a good electroconductive film is obtained.

REFERENCE SIGNS LIST

10: primary film
11, 12, 13 and 14: side of primary film
20: crystallized film
21, 22, 23 and 24: side of crystallized film
30: primary film
31 and 32: side of primary film
40: crystallized film
41 and 42: side of crystallized film
50: resin film
51 and 52: side of resin film
53: surface of resin film
60: knurled film
61: protrusion
62 and 63: region where protrusion is formed
70: barrier film
100: holding device
110: frame
121, 122, 123 and 124: clip
200: resin film production device
300: tenter stretching machine
310 and 320: link device
311 and 321: clip
312a-312d: link plate
313a and 313b: bearing roll
330 and 340: sprocket
410 and 420: conveying roll
500: oven
510: inlet of oven
520: outlet of oven
530: partition of oven
540: crystallization chamber
550: relaxation chamber
600: laser beam irradiation device
610: laser beam
700: film formation device
701: roll of resin film
702: roll of barrier film
711: guide roll
712: can roll
713: guide roll
721: reaction tube
722: electrode
723: electric power source
724: gas introducing port
730: vacuum exhaust device
790: vacuum chamber

The invention claimed is:

1. A resin film formed of a resin containing an alicyclic structure-containing polymer having crystallizability, wherein an absolute value of a thermal size change ratio when the film is heated at 150° C. for 1 hour is 1% or less in any in-plane direction of the film, a deformation amount of the film by irradiation with a laser beam is 7 μm or less, and the deformation amount of the film was determined by:
irradiating a region of 20 mm ×20 mm of the sample film with a laser beam having laser wavelength of 10.6 μm and irradiation intensity of 20 W to form a total of 36 protrusions of 6 lines and 6 columns disposed at intervals of 4 mm in each of lengthwise and transverse directions;

placing a glass plate with a thickness of 1.2 mm and a size of 50 mm in length and 50 mm in width on the protrusions;

measuring thickness of the film at each of the formed protrusions; and determining difference between the maximum and minimum values of the measured values.

2. The resin film according to claim 1, wherein the alicyclic structure-containing polymer is a hydrogenated product of a ring-opened polymer of dicyclopentadiene.

3. The resin film according to claim 1, wherein the resin film is an optical film.

4. A barrier film comprising:
the resin film according to claim 1; and
a barrier layer provided on the resin film.

5. An electroconductive film comprising:
the resin film according to claim 1; and
an electroconductive layer provided on the resin film.

6. A method for producing the resin film according to claim 1, comprising:
a step of setting a temperature of a first film formed of a resin containing an alicyclic structure-containing polymer having crystallizability to a temperature which is equal to or higher than a glass transition temperature of the alicyclic structure-containing polymer and equal to or lower than a melting point of the alicyclic structure-containing polymer in a strained state where at least two sides of the first film are held, to obtain a crystallized film; and
a step of relaxing strain of the crystallized film while the crystallized film is kept flat at a temperature which is equal to or higher than the glass transition temperature of the alicyclic structure-containing polymer and equal to or lower than the melting point of the alicyclic structure-containing polymer.

7. The method according to claim 6, comprising a step of stretching the first film before the step of obtaining the crystallized film.

8. A method for producing a bather film, comprising a step of forming a barrier layer on the resin film according to claim 1.

9. A method for producing an electroconductive film, comprising a step of forming an electroconductive layer on the resin film according to claim 1.

* * * * *